(12) United States Patent
Hess et al.

(10) Patent No.: US 7,184,794 B2
(45) Date of Patent: Feb. 27, 2007

(54) ELECTRONIC APPARATUS AND SYSTEM WITH MULTI-PURPOSE INTERFACE

(75) Inventors: David M. Hess, McHenry, IL (US); Mark J. Carlson, Round Lake, IL (US); Timothy M. McCune, Cary, IL (US)

(73) Assignee: Motorola, Inc., Schaumburg, IL (US)

( * ) Notice: Subject to any disclaimer, the term of this patent is extended or adjusted under 35 U.S.C. 154(b) by 344 days.

(21) Appl. No.: 10/937,125

(22) Filed: Sep. 9, 2004

(65) Prior Publication Data

US 2006/0052072 A1   Mar. 9, 2006

(51) Int. Cl.
*H04B 1/38* (2006.01)
*H04M 1/00* (2006.01)

(52) U.S. Cl. .................. 455/559; 455/556.1; 455/550.1

(58) Field of Classification Search ............. 455/556.1, 455/557, 559, 550.1, 575.1, 575.3, 558, 66.1; 710/63, 64

See application file for complete search history.

(56) References Cited

U.S. PATENT DOCUMENTS

| | | | |
|---|---|---|---|
| 6,959,205 B2* | 10/2005 | Yambe | 455/557 |
| 7,103,381 B1* | 9/2006 | Wright et al. | 455/557 |
| 2003/0104836 A1* | 6/2003 | Shinohara | 455/557 |
| 2004/0063464 A1* | 4/2004 | Akram et al. | 455/559 |
| 2005/0055244 A1* | 3/2005 | Mullan et al. | 705/2 |
| 2005/0064905 A1* | 3/2005 | Pinder | 455/557 |
| 2005/0075133 A1* | 4/2005 | Pinder et al. | 455/557 |
| 2005/0208963 A1* | 9/2005 | Shinohara | 455/550.1 |
| 2005/0267999 A1* | 12/2005 | Suematsu et al. | 710/14 |
| 2006/0190529 A1* | 8/2006 | Morozumi et al. | 709/203 |

* cited by examiner

*Primary Examiner*—Sonny Trinh
(74) *Attorney, Agent, or Firm*—Philip Premysler; Sylvia Chen

(57) ABSTRACT

A highly versatile interface that is capable of digital and audio signal coupling is provided. The interface comprises contacts (122, 124, 216, 218) that are used to couple both audio and digital signals, and separate contacts (126, 220) that are used initiate and negotiate signaling mode transitions. Transitions can be effected without creating glitches, e.g., audible noise, in audio signals that are being coupled through the interface.

28 Claims, 24 Drawing Sheets

ELECTRONIC APPARATUS AND SYSTEM WITH MULTI-PURPOSE INTERFACE

FIELD OF THE INVENTION

The present invention relates in general to peripheral interfaces. More particularly, the present invention relates to a multi-purpose peripheral interface.

BACKGROUND OF THE INVENTION

The adaptation of handheld communication devices, such as cellular telephones, text messaging devices and devices that support multiple different communication modes, has had a transformative effect on personal communications over the last decade. Such handheld devices have untethered their users from the fixed Plain Old Telephone System (POTS) land lines and desktop computers networked through the POTS and have provided ubiquitous communications and instant reachability.

In the future, it is expected that handheld communication devices (in particular cellular telephones) will carry a variety of personal and/or financial information, and be able to interface with a variety of disparate systems. Such enhanced cellular telephones are expected to be used for, among other things, file storage and transfer, identification, access control, and making and receiving payments—in addition to communication.

Given the need to interface with a variety of systems, such as systems in cars, home entertainment systems, public and private infrastructure, personal computers, etc, and the limited size of handheld communication devices, it is desirable to provide a limited number of interfaces or one very versatile interface. One form of interface is wireless. An example of a wireless interface that might be used to provide local connectivity is known as Bluetooth. However, in certain circumstances, wireless security concerns, interference issues, and power dissipation issues weigh in favor of using a wired interface. Thus, it is desirable to provide a very versatile wired interface for handheld communication devices.

It is desirable to be able to use such versatile wired interface to couple analog signals, such as audio signals, and a variety of types of digital signals. It is furthermore desirable to be able to transition between different types of signaling without causing any glitches. In particular, it is desirable to be able to transition to and from audio signaling without causing audible noise.

BRIEF DESCRIPTION OF THE FIGURES

The present invention will be described by way of exemplary embodiments, but not limitations, illustrated in the accompanying drawings in which like references denote similar elements, and in which.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Figure 1:
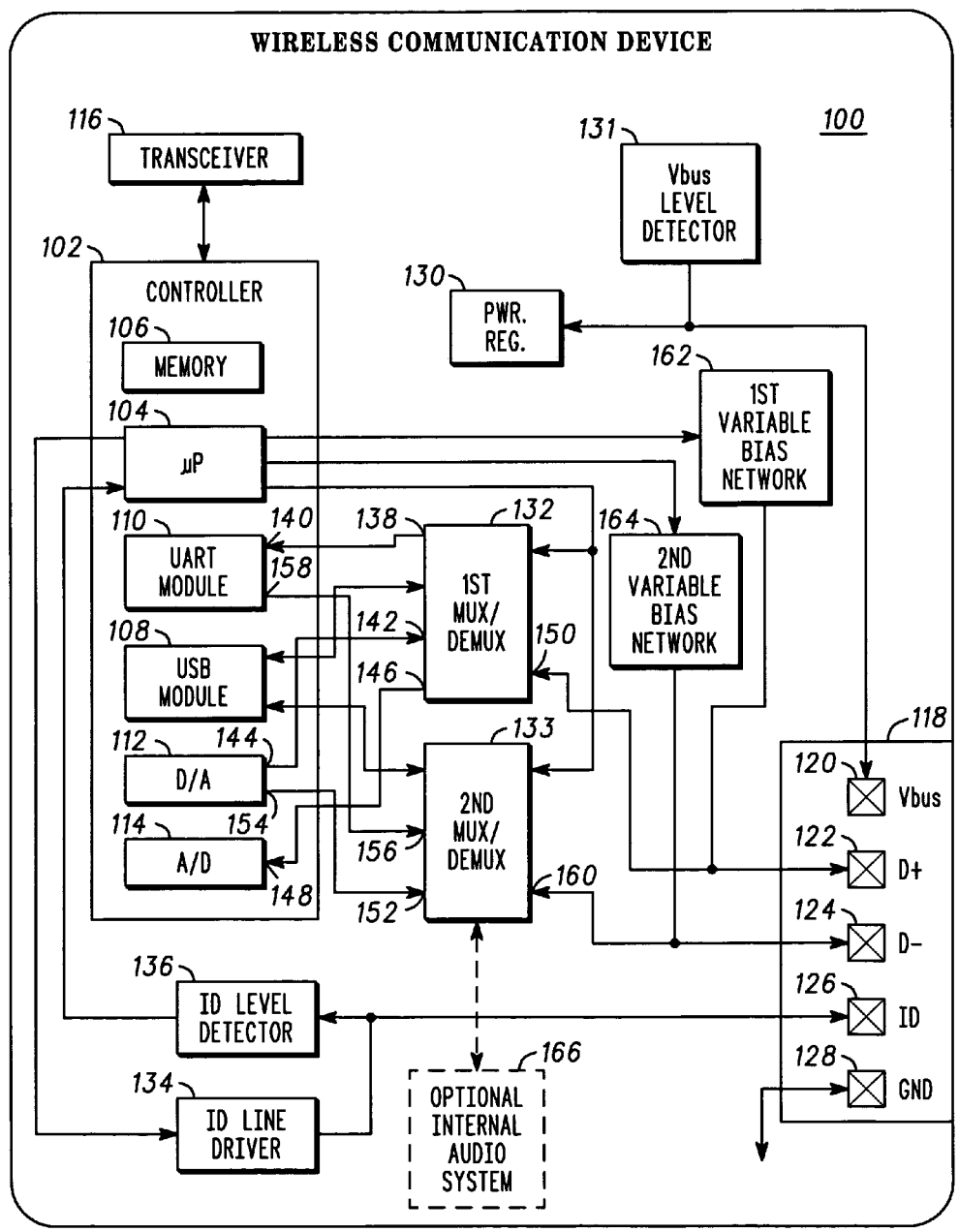
FIG. 1 is a block diagram of a wireless communication device according to an embodiment.

FIG. 1 is a block diagram of a wireless communication device 100 according to an embodiment. The wireless communication device 100 is one example of an electronic apparatus that can serve as a hosting device according to the teachings described herein, and interface with an external device. The wireless communication device 100 has a first controller 102 with a first microprocessor 104, a first memory 106, a first Universal Serial Bus (USB) module 108, a first Universal Asynchronous Receiver/Transmitter (UART) module 110, a Digital-to-Analog converter (D/A) 112, and an Analog-to-Digital converter (A/D) 114. Alternatively, rather than being integrated in the first controller 102, the foregoing components can be implemented separately. The memory 106 is used to store programs that are executed by the first microprocessor 104 to operate the device 100. Aspects of the operation of the device 100 are described below with reference flowcharts. The first USB module 108 and the first UART module 110 are used to communicate digital message signals with external devices. The D/A 112 is used, in certain cases, to generate analog signals that are coupled out to external devices. The A/D 114 is used, in certain cases, to digitize analog signals that are received from external devices.

A transceiver 116 is coupled to the first controller 102. The transceiver 116 is used to send and receive wireless communications through, for example, a cellular network, a satellite network, or a wireless Local Area Network (LAN).

A first connector 118 is used to connect the device 100 with other, external devices. The first connector 118 has a first bus voltage connection contact 120, a first signaling line contact (D+) 122, a second signaling line contact (D−) 124, a first separate interrupt line contact (ID) 126 and a first ground reference connection contact 128. Within, the device 100, the first bus voltage connection contact 120 is coupled to a power regulator 130 and a bus voltage level detector 131, the first signaling line contact 122 is coupled to a first switch network, in particular a first multiplexer/demultiplexer (MUX/DEMUX) 132, the second signaling line contact 124 is coupled to a second switch network, in particular a second MUX/DEMUX 133, and the first interrupt line contact 126 is coupled to a first ID line driver 134 and to a first ID level detector 136. The first ground reference contact 128 is coupled to a ground plane (not shown) of the device 100.

The first MUX/DEMUX 132 is also coupled to the first USB module 108, the first UART module 110, the D/A 112 and the A/D 114. A first terminal 138 of the first MUX/DEMUX terminal 132 is coupled to an input contact 140 of the first UART module 110, a second terminal 142 of the first MUX/DEMUX 132 is coupled to a first channel output 144 of the D/A 112, a third terminal 146 of the first MUX/DEMUX 132 is coupled to an input 148 of the A/D 114, and a fourth terminal 150 of the first MUX/DEMUX 132 is coupled to the first signaling line contact (D+) 122. The first MUX/DEMUX 132 serves to selectively couple the first signaling line contact (D+) 122 to either the input 140 of the first UART module 110, the first channel output 144 of the D/A 112, the input 148 of the A/D 114 or the USB module 108. With respect to the functioning of the terminals of the first MUX/DEMUX 132, the first terminal 138 serves as an output, the second terminal 142 serves as an input, the third terminal 146 serves as an output, and the fourth terminal 150 serves as both an input and an output.

The second MUX/DEMUX 133 is also coupled to the first USB module 108, the first UART module 110, and the D/A 112. In particular a first terminal 152 of the second MUX/DEMUX 133 is coupled to a second channel output 154 of the D/A 112, a second terminal 156 of the second MUX/DEMUX 133 is coupled to an output terminal 158 of the first UART module 110, and a third terminal 160 of the second MUX/DEMUX 133 is coupled to the second signaling line contact (D−) 124. The second MUX/DEMUX 133 serves to selectively couple the second signaling line contact (D−) 124 to either the second channel output 154 of the D/A 112, the output terminal 158 of the first UART module 110, or the first USB module 108. Note that the first USB module uses differential signaling for receiving and sending signals. Regarding the terminals of the second MUX/DEMUX 133, the first terminal 152 serves as an input, the second terminal 156 serves as an input and the third terminal 160 serves as both an input and an output.

The first signaling line contact (D+) 122 and the second signaling line contact (D−) 124 are coupled to the first UART module 110 or the USB module 108 when the device 100 is configured for digital message signaling. In UART mode, digital signal messages will be input through the first signaling line contact (D+) 122 and output through the second signaling line contact (D−) 124. When the device 100 is to be configured to output stereo (two channel) audio analog signals through the connector 118, the first channel output 144 of the D/A 112 is coupled to the first signaling line contact (D+) 122 and the second channel output 154 of the D/A 112 is coupled to the second signaling line contact (D−) 124. When the device 100 is to be configured for duplex mono audio analog signaling the first signaling line contact (D+) 122 is coupled to the input 148 of the A/D 114, and the second channel output 154 of the D/A 112 is coupled to the second signaling line contact (D−) 124.

The first microprocessor 104 is also coupled to the first MUX/DEMUX 132 and the second MUX/DEMUX 133 and controls the routing of signals by the first MUX/DEMUX 132 and the second MUX/DEMUX 133.

A first variable bias network 162 is coupled to the first signaling line contact (D+) 122, and a second variable bias network 164 is coupled to the second signaling line contact (D−) 124. The biasing networks 162, 164 (and 256, 258, FIG. 2) include, for example, one or more voltage sources, and one or more biasing resistors. The biasing networks 162, 164 are used to bias the signaling line contacts 122, 124 to a plurality of different voltage levels that are appropriate for different signaling modes, i.e. UART signaling, USB signaling, and analog audio signaling.

The ID line driver 134 is used to drive the first interrupt line contact 126 to different levels in the course of negotiating transitions between different signaling modes with an external device. The level detector 136 is used to detect changes in voltage levels on the first interrupt line contact 126 which are caused by a line driver in an external device in the course of transitions between signaling modes. The use of the interrupt line contact is described in more detail below. The bus voltage level detector 131 is used to detect the connection of the wireless communication device 100 to an external device.

The device 100 optionally includes an internal audio system 166 that includes, for example, an internal microphone, an internal speaker, and amplifiers.

Figure 2:
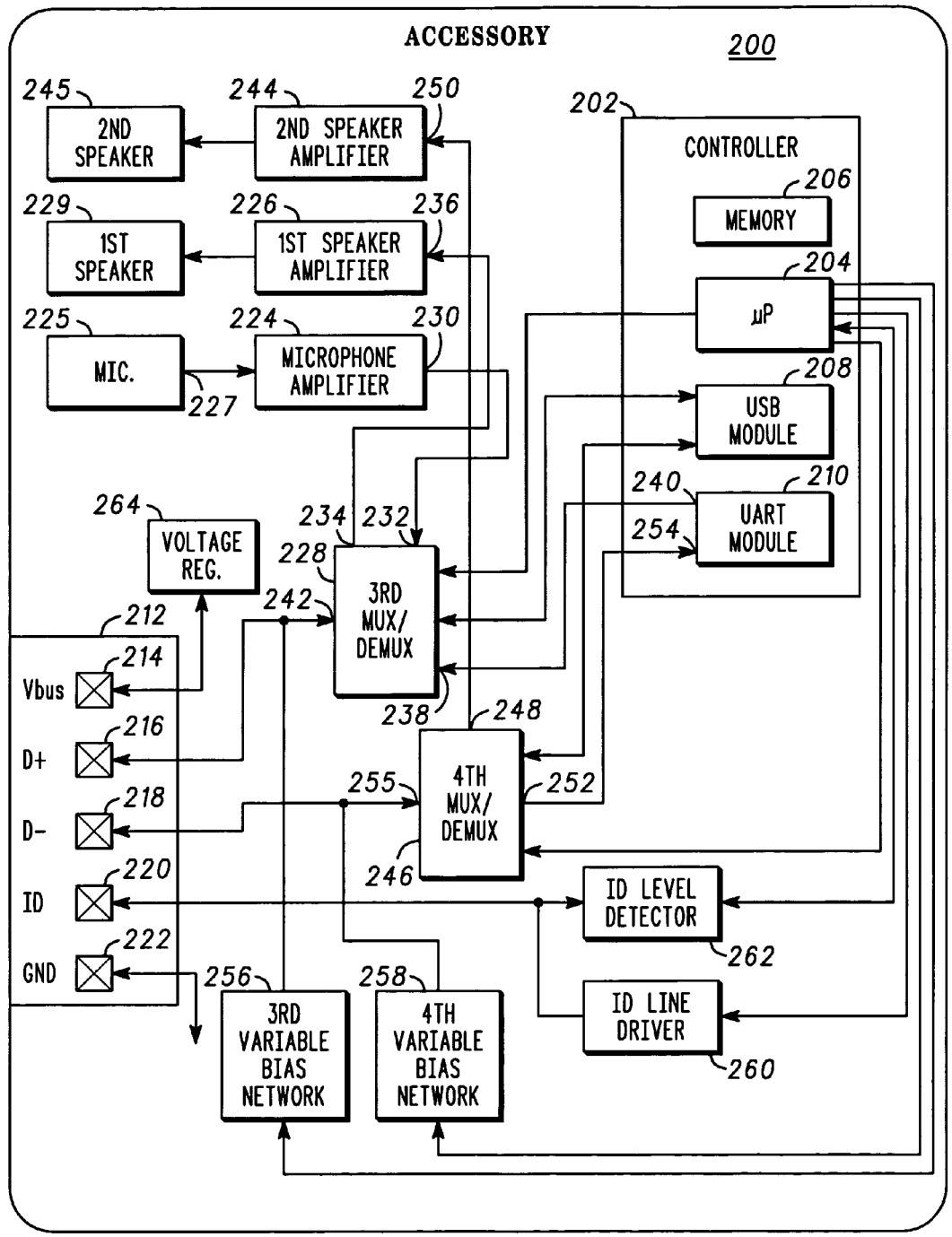
FIG. 2 is a block diagram of an accessory that is capable of interfacing with the wireless communication device shown in FIG. 1 in several different modes according to an embodiment.

FIG. 2 is a block diagram of an accessory 200 that is capable of interfacing with the wireless communication device 100 shown in FIG. 1 in several different modes according to an embodiment. The accessory 200 is one example of a device that can serve as the external device referred to above that can interface with the wireless communication device 100. From the perspective of the accessory 200, the wireless communication device 100 is an external device.

The accessory 200 includes a second controller 202 with a second microprocessor 204, a second memory 206, a second USB module 208, and a second UART module 210. The accessory 200 interfaces to an external device, e.g., the wireless communication device 100, through a second connector 212. The second connector 212 has contacts for coupling, e.g., directly or through a cable, to the contacts 120, 122, 124, 126, 128 of the first connector 118. In particular, the second connector 212 includes a second bus voltage connection contact 214, a third signaling line contact (D+) 216, a fourth signaling line contact (D−) 218, a second separate interrupt line contact 220, and a second ground reference contact 222. The third signaling line contact (D+) 216 couples to the first signaling line contact (D+) 122 of the first connector 118, and the fourth signaling line contact (D−) 218 couples to the second signaling line contact (D−) 124 of the first connector 118, directly or through a cable. The coupling of the third signaling line contact (D+) 216 and the first signaling line contact (D+) 122 is referred to as a D+ line, and the coupling of the fourth signaling line contact (D−) 218 to the second signaling line contact (D−) 124 is referred to as a D− line. The first separate interrupt line contact (ID) 126 and the second separate interrupt line contact 220 are coupled together (e.g., through a cable, or directly) forming what is referred to hereinbelow as an ID line. The second bus voltage connection contact 214 couples to the first bus voltage connection contact 120. The second ground reference contact 222 couples to the first ground reference connection contact 128.

The third signaling line contact (D+) 216, a microphone amplifier 224, a first speaker amplifier 226, the second USB module 208, and the second UART module 210 are coupled to a third switch network in particular a third MUX/DEMUX 228. In particular, an output 230 of the microphone amplifier 224 is coupled to a first terminal 232 of the third MUX/DEMUX 228, a second terminal 234 of the third MUX/DEMUX 228 is coupled to an input 236 of the first speaker amplifier 226, a third terminal 238 of the third MUX/DEMUX 228 is coupled to an output 240 of the second UART module 210, and a fourth terminal 242 of the third MUX/DEMUX is coupled to the third signaling line contact (D+) 216. The third MUX/DEMUX 228 serves to selectively couple the third signaling line contact (D+) 216 to either the output 230 of the microphone amplifier 224, the input 236 of the first speaker amplifier 226, or the output 240 of the UART module 210 or the second USB module 208. Regarding the terminals of the third MUX/DEMUX 228, the first terminal 232 serves as an input, the second terminal 234 serves as an output, the third terminal 238 serves as an input and the fourth terminal 242 serves as both an input and an output.

The fourth signaling line contact (D−) 218, a second speaker amplifier 244, the second UART module 210 and the second USB module 208 are coupled to a fourth switch network in particular a fourth MUX/DEMUX 246. In particular, a first terminal 248 of the fourth MUX/DEMUX 246 is coupled to an input 250 of the second speaker amplifier 244, a second terminal 252 of the fourth MUX/DEMUX 246 is coupled to an input 254 of the second UART module 210, and a third terminal 255 of the fourth MUX/DEMUX 246 is coupled to the fourth signaling line contact (D−) 218. The fourth MUX/DEMUX 246 serves to selectively couple either the input 250 of the second speaker amplifier 244, the input 254 of the second UART module 210, or the second USB module 208 to the fourth signaling line contact (D−) 218. Regarding the terminals of the fourth MUX/DEMUX 246, the first terminal 248 serves as an output, the second terminal 252 serves as an output and the third terminal 255 serves as both an input and an output.

A microphone 225 is coupled to an input 227 of the microphone amplifier 224, a first loudspeaker 229 is coupled to the first speaker amplifier 226, and a second loudspeaker 245 is coupled to the second speaker amplifier 244.

For duplex mono analog audio signaling, the third MUX/DEMUX 228 is configured to couple the output 230 of the microphone amplifier 224 to the third signaling line contact (D+) 216, and the fourth MUX/DEMUX 246 is configured to couple the fourth signaling line contact (D−) 218 to the input 250 of the second speaker amplifier 244. For stereo audio signaling, the third MUX/DEMUX 228 is configured to couple the third signaling line contact (D+) 216 to the input 236 of the first speaker amplifier 226, and the fourth MUX/DEMUX 246 is configured to couple the fourth signaling line contact (D−) 218 to the input 250 of the second speaker amplifier 244. For sending and receiving UART digital signal messages, the third MUX/DEMUX 228 is configured to couple the third signaling line contact (D+) 216 to the output 240 of the second UART module 210 and the fourth MUX/DEMUX 246 is configured to couple the fourth signaling line contact (D−) 218 to the input 254 of the second UART module 210.

The second microprocessor 204 is also coupled to the third MUX/DEMUX 228 and the fourth MUX/DEMUX 246 and controls the routing of signals by the third MUX/DEMUX 228 and the fourth MUX/DEMUX 246. The USB module uses differential signaling, using the third signaling line contact (D+) 216 and the fourth signaling line contact (D−) 218 in both receive and transmit mode.

The accessory 200 has a third variable bias network 256 that is coupled to the third signaling line contact (D+) 216 and a fourth variable bias network 258 that is coupled to the fourth signaling line contact (D−) 218. The third 256 and fourth 258 variable biasing networks serve to bias the third 216 and fourth 218 signaling line contacts to levels that are appropriate for different types of signals, e.g. USB signals, UART signals and analog audio signals.

The accessory 200 includes a second ID line driver 260, and a second ID level detector 262 which are coupled to the second separate interrupt line contact 220. The second ID line driver 260 serves to drive a voltage on the second separate interrupt line contact 220 to different levels in the course of negotiating transitions between different signaling modes with the wireless communication device 100 or another external device. The second ID level detector 262 is used to detect changes in voltage levels on the second interrupt line contact 220 which are caused by the first line driver 134 in the wireless communication device 100 or by a line driver in another device with which the accessory 200 is interfaced in the course of transitions between signaling modes. The first ID level detector 136 and the second ID level detector 262 detect high and low signal states by comparing the voltage on the ID line to one or more voltage thresholds that are intermediate a voltage corresponding to the high signal state and the a voltage corresponding to the low signal state. The use of the interrupt line contact is described in more detail below. A bus voltage regulator 264 is coupled to the second bus voltage connection contact 214. When the accessory 200 is connected to the device 100, the bus voltage level detector 131 will sense that the device 100 is connected to the accessory 200 by sensing that the voltage on the first bus voltage connection contact 120 has been regulated to a predetermined voltage level.

Figure 3:
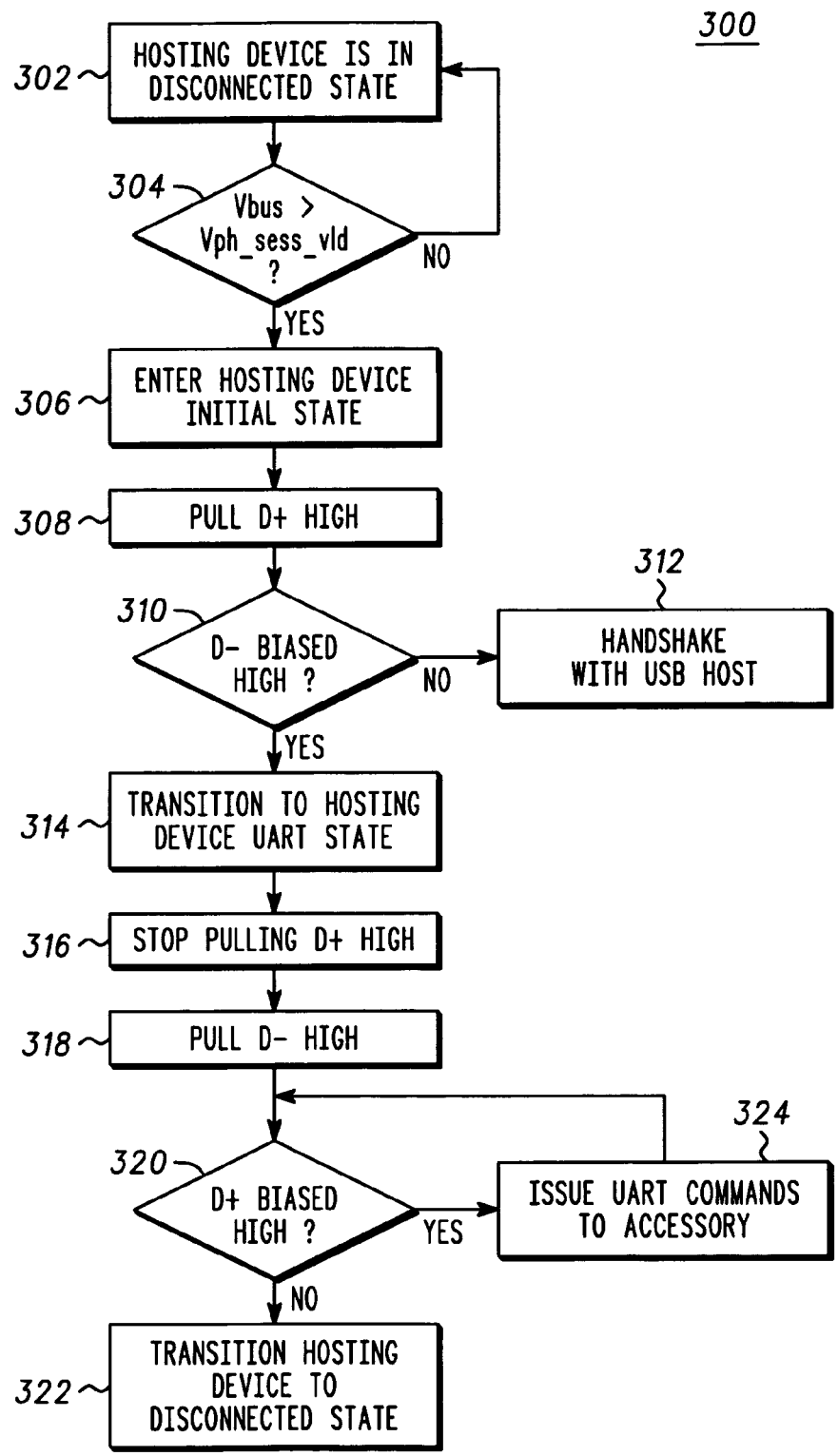
FIG. 3 is a first flowchart showing actions performed by a hosting device such as the wireless communication device shown in FIG. 1 in connecting to an accessory such as the accessory shown in FIG. 2.
Figure 4:
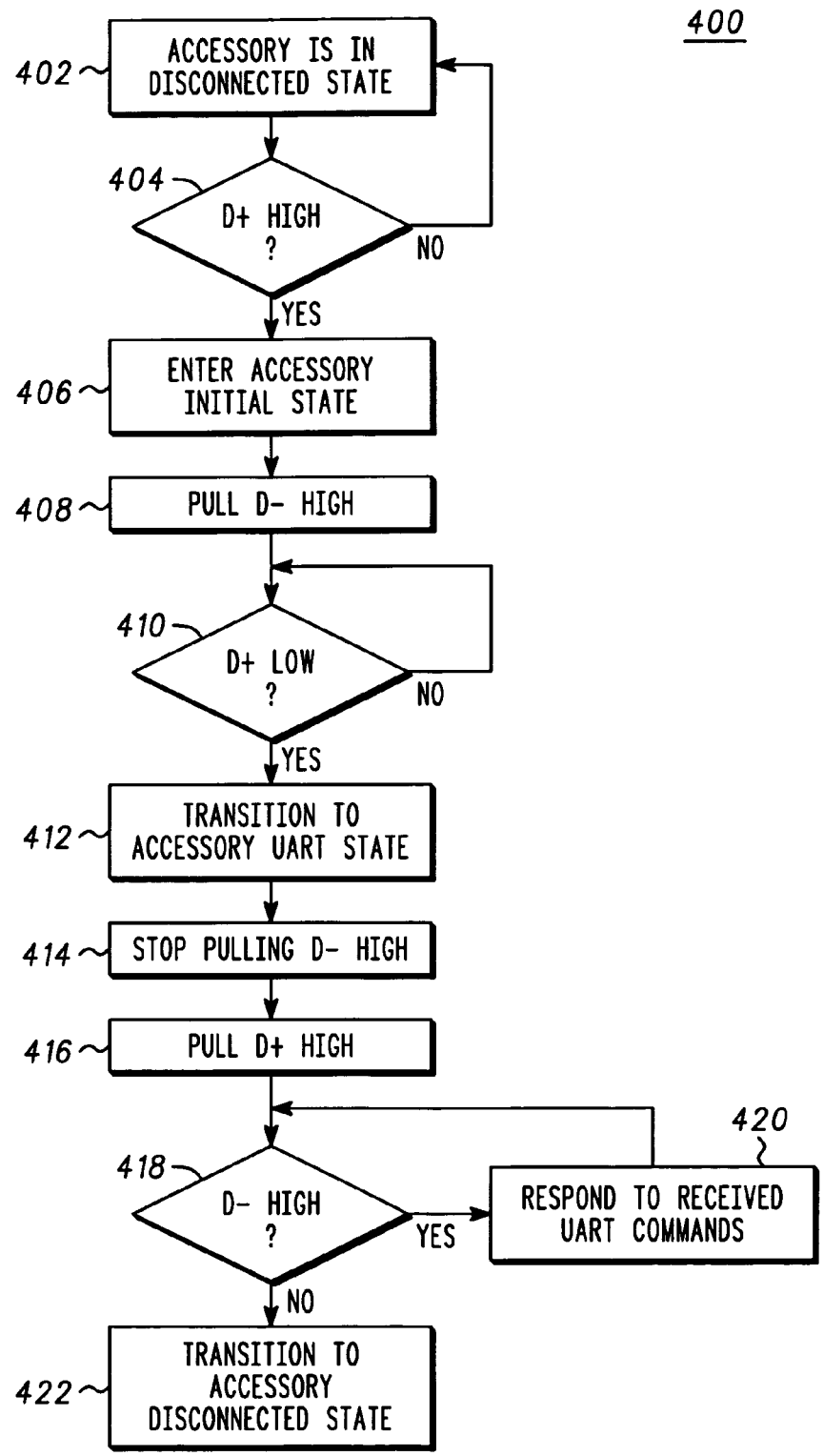
FIG. 4 is a second flowchart showing actions performed by an accessory such as the accessory shown in FIG. 2 in coordination with the actions shown in FIG. 3 performed by a hosting device such as the wireless communication device shown in FIG. 1.
Figure 5:
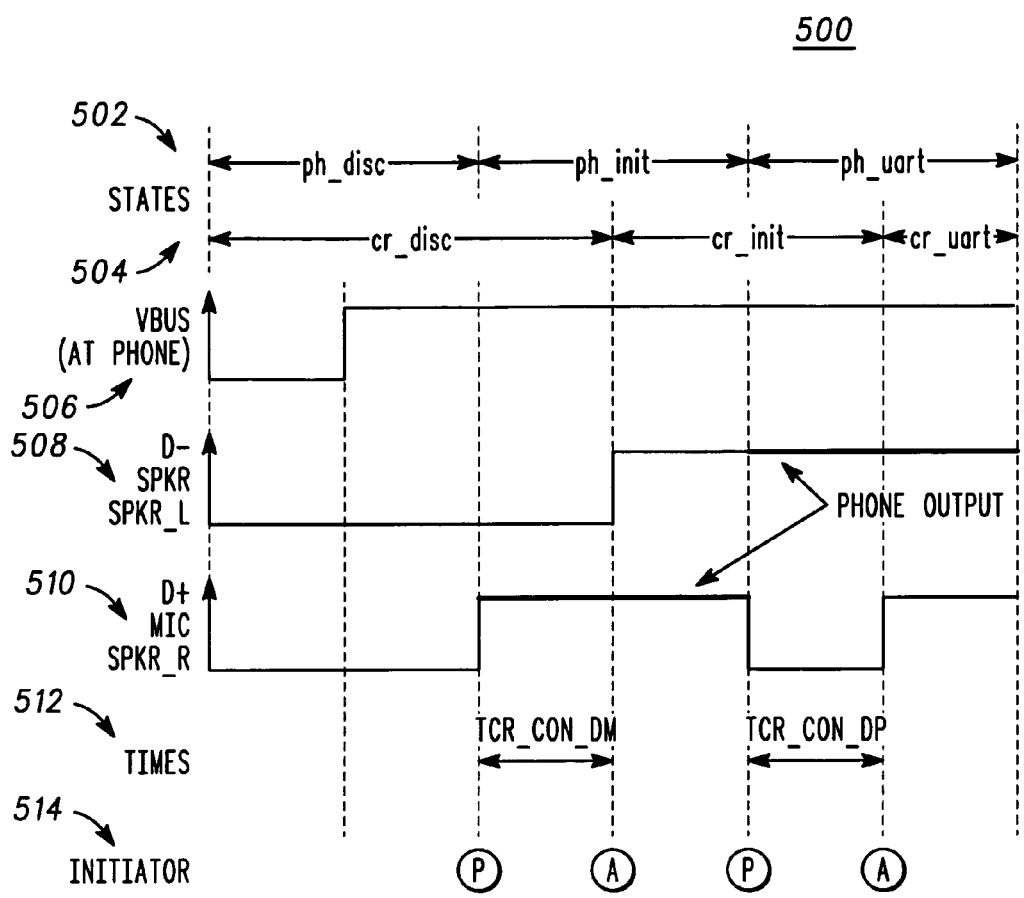
FIG. 5 is a first signal chart showing signals exchanged between a hosting device such as the wireless communication device shown in FIG. 1 and an accessory such as the accessory shown in FIG. 2 in the process of connecting.

FIG. 3 is a first flowchart 300 showing actions performed by a hosting device in connecting to the accessory shown in FIG. 2, FIG. 4 is a second flowchart 400 showing actions performed by an accessory in coordination with the actions shown in FIG. 3, and FIG. 5 is a first signal chart 500 showing signals exchanged between the hosting device and the accessory in the process of connecting. The wireless communication device 100 or another device with the capability to perform the actions shown in FIG. 3 can serve as the hosting device. The accessory 200 shown in FIG. 2 or another accessory with the capability to perform the steps shown in FIG. 4 can serve as the accessory that connects to the hosting device.

As indicated in block 302 of the first flowchart 300 and block 402 of the second flowchart 400, the process of connecting starts with the hosting device (e.g., 100) and the accessory (e.g., 200) in a disconnected state. Following block 302, block 304 of the first flowchart is a decision block, the outcome of which depends on whether the voltage on the first bus voltage connection contact 120 is at a predetermined level that indicates that the hosting device is connected to the accessory (e.g., 200). If the outcome of block 304 is negative then the hosting device continues in the disconnected state. If, on the other hand, the outcome of decision block 304 is affirmative, then the hosting device proceeds to block 306 and enters an initial (pre-connection) state.

Referring momentarily to FIG. 5, a brief explanation of the first signal chart 500 will be given. The first line 502 indicates the state of the hosting device (e.g., 100). The states of the hosting device are labeled ph_disc which is the disconnected state, ph_init which is the initial state entered in block 306, and ph_uart which is a UART signaling state. The second line 504 indicates the state of the accessory (e.g., 200). The states shown in the first signal chart 500 are labeled cr_disc which stands for the accessory's disconnected state, cr_init which stands for an initial (pre-connection) state for accessory, and cr_uart which is a UART signaling state. The third line 506 indicates the voltage level on the first 120 and second 214 bus voltage connection contacts which are now coupled (e.g. via a cable, or directly). The fourth line 508 shows the signal on the second signaling line contact (D−) 124 and the fourth signaling line contact (D−) 218 which are now coupled. The fifth line 510 shows the signal on the first signaling line contact (D+) 122 and the third signaling line contact (D+) 216 which are now coupled. The sixth line 512 shows time intervals between host and accessory initiated events. In the seventh line 514 the initiator of each particular signal event occurring at a particular time is identified. In the seventh line 514, the hosting device is identified by the letter P, the accessory is identified by the letter C, and events initiated by both devices are identified with the letter B. The signal charts shown in FIGS. 8, 11, 14, 17, 20, 23, 24 do not include line 506, but do include the remaining lines shown in FIG. 5 and also include an eighth line 802 that shows signals on the first separate interrupt line contact (ID) 126 and the second separate interrupt line contact 220.

Referring now as well to FIG. 3, the state transition that occurs in block 306 is between the ph_disc and the ph_init state. The latter transition is shown in the first line 502 of the first signal chart. In block 308 the hosting device pulls the first signaling line contact (D+) 122 high. In block 404 the accessory checks the voltage level on the third signaling line contact (D+) 216 (now coupled to the first signaling line contact (D+) 122). If the accessory (e.g., 200) were to find that the third signaling line contact (D+) was low, then the accessory (e.g., 200) would continue in the disconnected state. When the accessory detects that the third signaling line contact (D+) 216 has been pulled high, the accessory enters the accessory initial state cr_init as indicated in block 406, and shown in the second line 504 of the first signal chart 500. By pulling the first signaling line contact (D+) 122 high the hosting device initiates a handshake.

After entering the initial state cr_init, as shown in block 406, the accessory will pull the fourth signaling line contact (D−) 218 high, as shown in block 408, to send an acknowledgment to the hosting device. In block 310, a predetermined time after executing block 308, the hosting device will check the voltage level on the second signaling line contact (D−) 124 (now connected to the fourth signaling line contact (D−) 218). If it is determined that the voltage level on the second signaling line contact (D−) 124 is low, the hosting device will assume that the accessory is operating in USB mode and will proceed in block 312 with USB handshaking. The details of the USB handshaking are outside the focus of this description. If on the other hand the hosting device detects that the second signaling line contact (D−) 124 has been pulled high then the hosting device will transition to UART state as indicated in block 314. After entering the UART state, the hosting device will stop pulling the first signaling line contact (D+) 122 high as indicated in block 316 and, as indicate in block 318, pull the second signaling line contact (D−) 124 high. After pulling the fourth signaling line contact (D−) 218 high, the accessory (e.g., 200) will, in block 410, check the level of the third signaling line contact (D+) 216 to ascertain if the hosting device has transitioned to the UART state. When the accessory determines that the signal level on third signaling line contact (D+) 216 is low indicating that the hosting device has entered the UART state, the accessory transitions to UART state as shown in block 412, and thereafter, as indicated in block 414, stop pulling the fourth signaling line contact (D−) 218 high, and as indicated in block 416 pulls the third signaling line contact (D+) 216 high. Thereafter as indicated in blocks 320, 322 as long as the hosting device continues to detect that the first signaling line contact (D+) 122 remains biased high the hosting device will continue in the UART state conducting UART signaling, including for example issuing commands to the accessory as shown in block 324. When the hosting device detects that the first signaling line contact (D+) 122 is no longer biased high (not shown in FIG. 5) the hosting device will transition to the disconnected state as indicated in block 322.

Similarly, as indicated in block 418, 420 as long as the accessory continues to detect that the fourth signaling line contact (D−) 218 is biased high the accessory continues in the UART state conducting UART signaling. When the accessory detects that the fourth signaling line contact (D−) 218 is no longer biased high, the accessory will transition to the disconnected state as indicated in block 422

Figure 6:
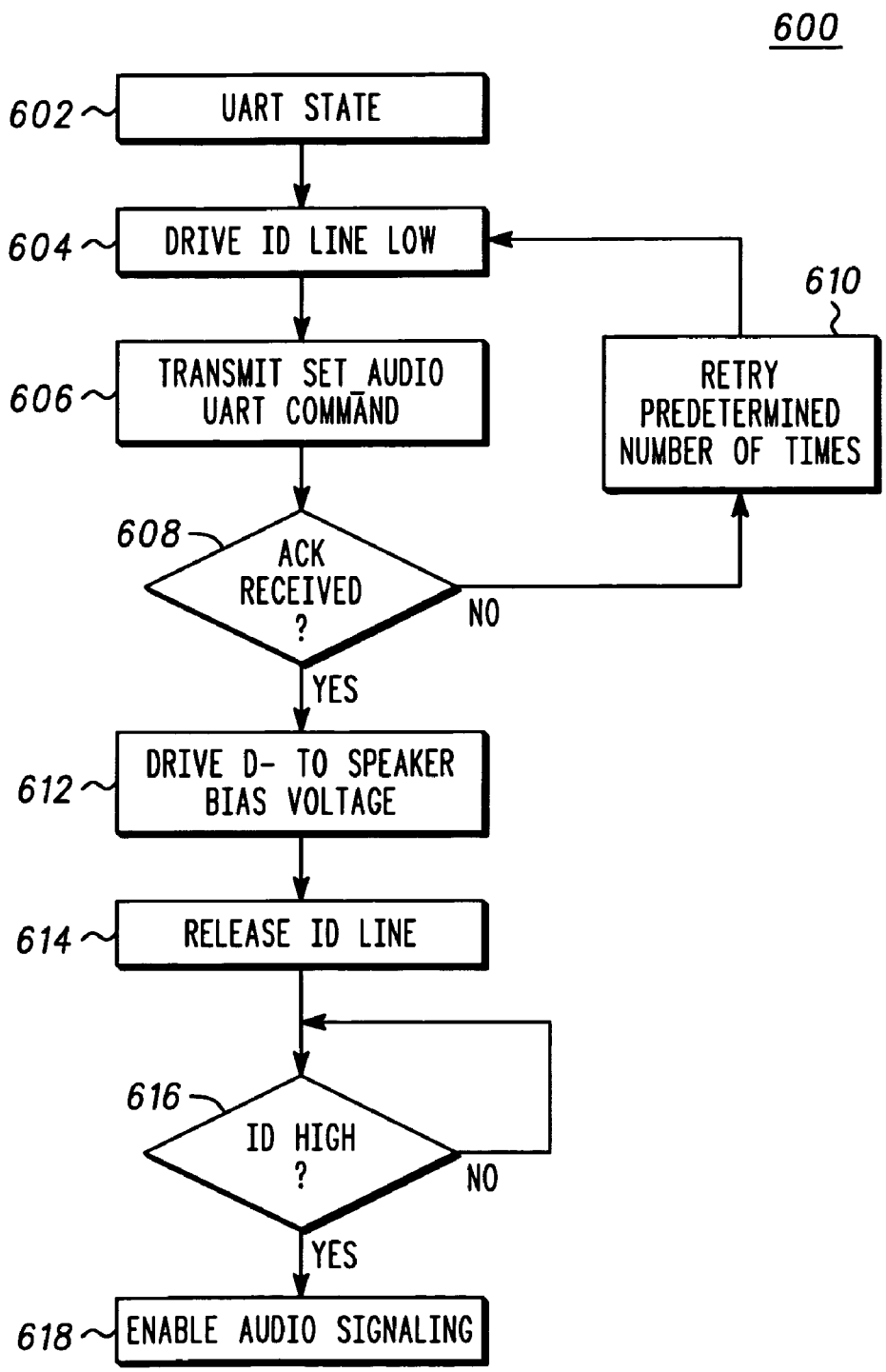
FIG. 6 is a third flowchart showing actions performed by a hosting device such as the wireless communication device shown in FIG. 1 in the course of initiating analog mono audio mode signaling between the hosting device and an accessory such as the accessory shown in FIG. 2.
Figure 7:
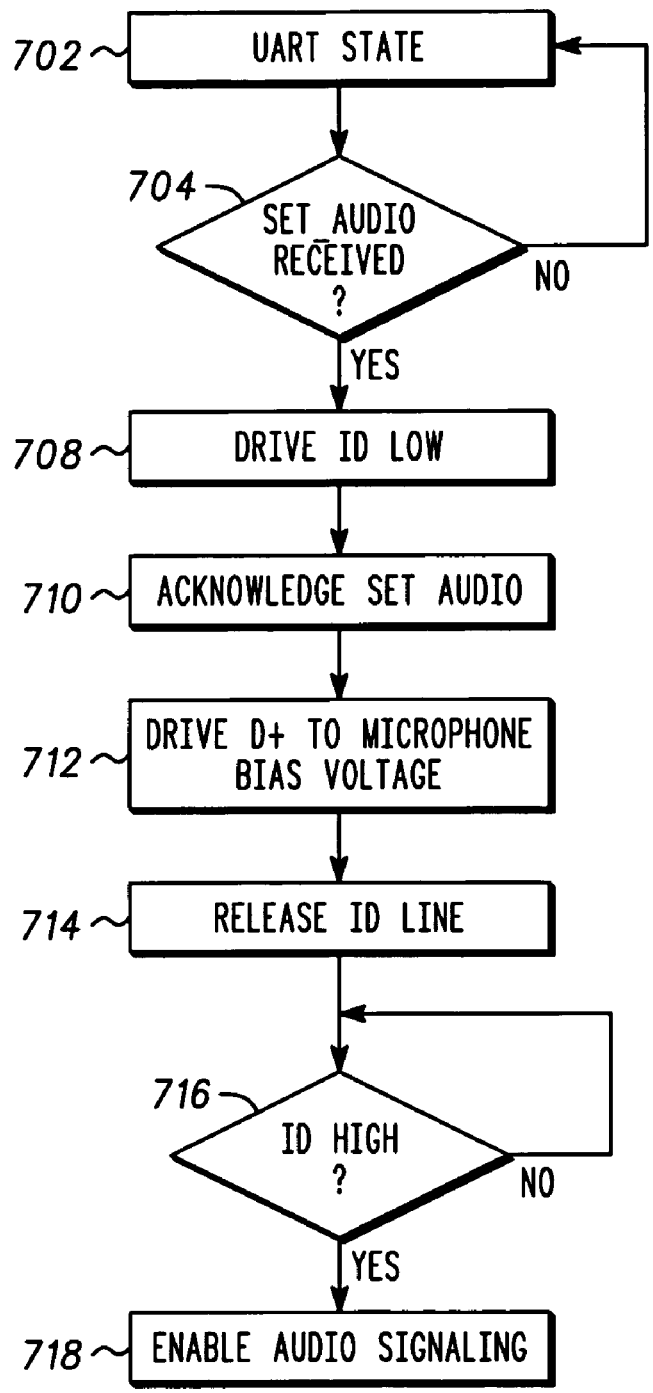
FIG. 7 is a fourth flowchart showing actions performed by an accessory such as the accessory shown in FIG. 2 in coordination with the actions shown in FIG. 6 which are performed by a hosting device such as the wireless communication device shown in FIG. 1.
Figure 8:
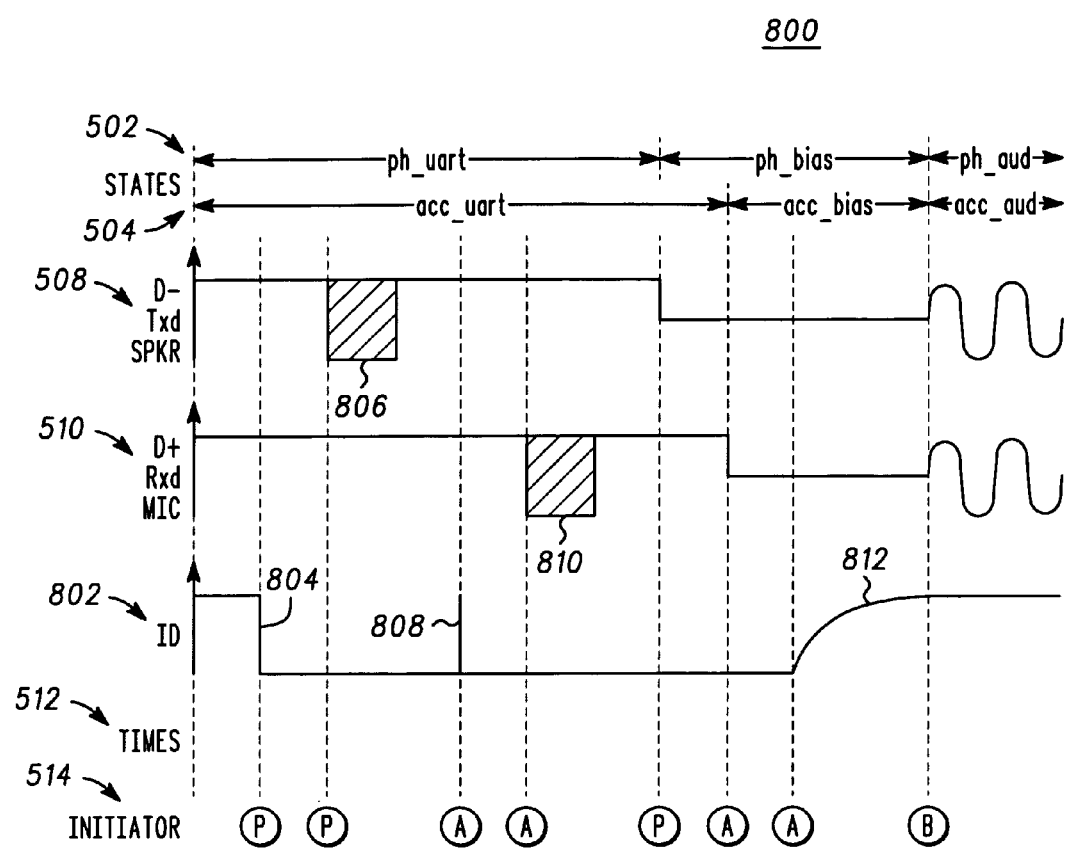
FIG. 8 is a second signal chart showing signals exchanged between a hosting device such as the wireless communication device shown in FIG. 1 and an accessory such as the accessory shown in FIG. 2 in the process of initiating analog mono audio mode signaling.

FIG. 6 is a third flowchart 600 showing actions performed by a hosting device, such as the wireless communication device 100, in the course of transitioning from UART signaling to analog mono audio mode signaling between the hosting device and an accessory such as the accessory shown in FIG. 2. FIG. 7 is a fourth flowchart 700 showing actions performed by an accessory such as the accessory 200 shown in FIG. 2 in coordination with the actions shown in FIG. 6 performed by a hosting device. FIG. 8 is a second signal chart 800 showing signals exchanged between a hosting device such as the wireless communication device and an accessory such as the accessory 200 shown in FIG. 2 in the process of transitioning from UART signaling to analog mono audio mode signaling. As indicated in blocks 602 and 702 of FIG. 6 and FIG. 7, the hosting device and the accessory start in the UART state which is the state reached upon executing programs embodying the first flowchart 300 and the second flowchart 400. In block 604 the hosting device drives the ID line low as indicated by reference numeral 804 in FIG. 8. The low state and a high state of the ID line correspond to predetermined voltage levels. In block 606 the hosting device transmits a SET_AUDIO UART command to the accessory through the D− line as shown by reference numeral 806 in FIG. 8. The SET_AUDIO UART command is an instruction to the accessory to configure itself to receive a mono analog audio signal from the hosting device through the D− line, and to send a mono analog audio signal to the hosting device through the D+ line.

Block 704 is a decision block, the outcome of which depends on whether the SET_AUDIO UART command has been received by the accessory. If not, the accessory remains in the UART state. If, on the other hand, the SET_AUDIO UART command is received then, in block 708, the accessory also starts driving the ID line low. The time at which the accessory starts driving the ID line is indicated by a vertical tick mark 808 on the eighth line signal 802 (FIG. 8). This vertical tick mark 808 is not an actual signal event. The ID line is already being driven low by the hosting device. After starting to drive the ID line low, in block 710, the accessory will send a UART message signal 810 acknowledging receipt of the SET_AUDIO command. Block 608 depends on whether the acknowledgement 810 is received by the hosting device. If not, the hosting device will retry initiating contact with the accessory a predetermined number of times as indicated in block 610. If acknowledgment is received, then, in block 612 the hosting device will transition to a state labeled ph_bias in FIG. 8 and drive the D− line to a bias level appropriate for a speaker or other audio device included in the accessory. In the case of wireless communication device 100 shown in FIG. 1 the second variable bias network 164 is used to bias the D− line. After sending the acknowledgment 810, in block 712 the accessory will transition to a state labeled acc_bias in FIG. 8 and drive the D+ line to a bias appropriate for a microphone or other audio device included in the accessory. In the case of the accessory shown in FIG. 2 the third variable bias network 256 is used to bias the D+ line. After the hosting device has biased the D− line, in block 614 the hosting device will release the ID line. After the accessory has biased the D+ line, in block 714 the accessory will release the ID line. As indicated in block 616 the hosting device will wait until the ID line rises as indicated at 812, FIG. 8 above a predetermined threshold before entering a state labeled ph_aud on the first line 502 of FIG. 8 and enabling audio signaling in block 618. As indicated in block 716, the accessory will also wait until the ID line rises as indicated at 812, FIG. 8 above a predetermined threshold before entering a state labeled acc_aud in the second line 504 of FIG. 8 and enabling audio signaling in block 718. In the case of the wireless communication device shown in FIG. 1, enabling the audio signaling includes configuring the first MUX/DEMUX 132 to couple the A/D 114 to the first signaling line contact (D+) 122, and configuring the second MUX/DEMUX 133 to couple the D/A 112 to the second signaling line contact (D−) 124. In the case of the accessory 200 having the design shown in FIG. 2, enabling audio signaling includes configuring the third MUX/DEMUX 228 to couple the output 230 of the microphone amplifier 224 to the third signaling line contact (D+) 216 and configuring the fourth MUX/DEMUX 246 to couple the input 250 of the second speaker amplifier 244 to the fourth signaling line contact (D−) 218.

Figure 9:
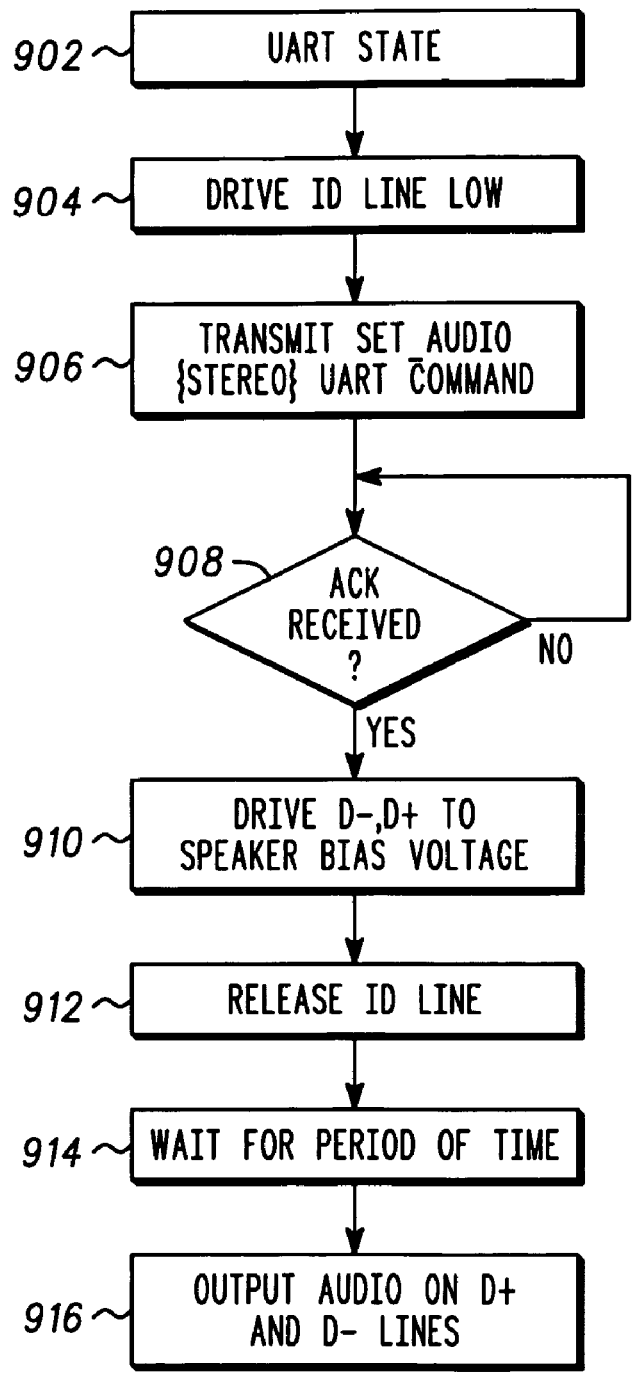
FIG. 9 is a fifth flowchart showing actions performed by a hosting device such as the wireless communication device shown in FIG. 1 in the course of initiating analog stereo audio mode signaling to an accessory such as the accessory shown in FIG. 2.
Figure 10:
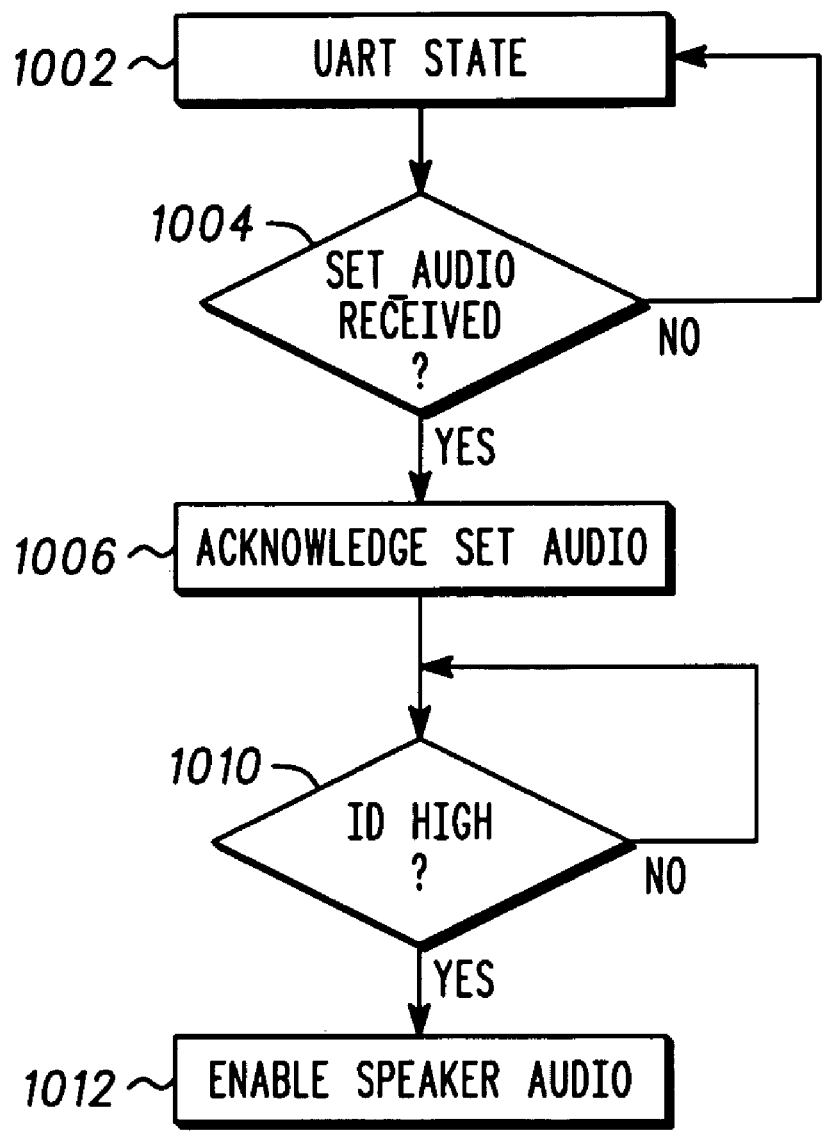
FIG. 10 is a sixth flowchart showing actions performed by an accessory such as the accessory shown in FIG. 2 in the coordination with the actions shown in FIG. 9.
Figure 11:
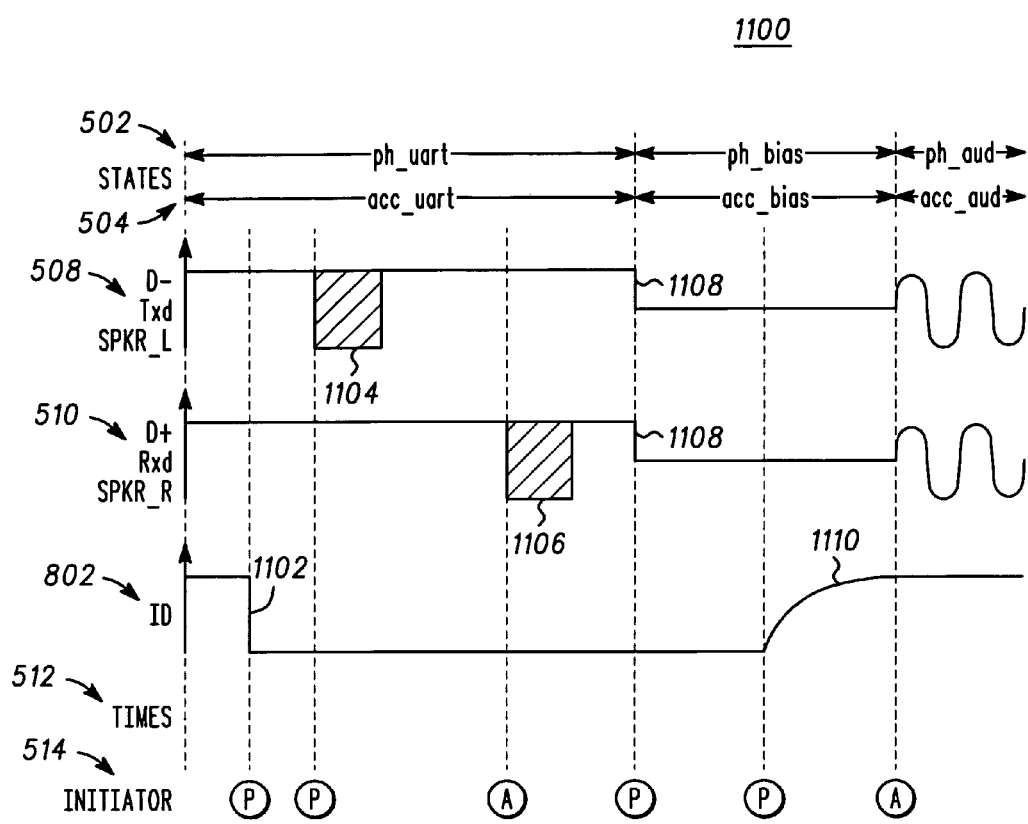
FIG. 11 is a third signal chart showing signals exchanged between a hosting device such as the wireless communication device shown in FIG. 1 and an accessory such as the accessory shown in FIG. 2 in the course of performing the actions shown in FIGS. 9–10.

FIG. 9 is a fifth flowchart 900 showing actions performed by a hosting device such as the wireless communication device 100 shown in FIG. 1 in the course of initiating analog stereo audio mode signaling to an accessory such as the accessory 200 shown in FIG. 2. FIG. 10 is a sixth flowchart 1000 showing actions performed by an accessory such as the accessory 200 shown in FIG. 2 in coordination with the actions shown in FIG. 9. FIG. 11 is a third signal chart 1100 showing signals exchanged between a hosting device such as the wireless communication device 100 shown in FIG. 1 and an accessory such as the accessory 200 shown in FIG. 2 in the course of performing the actions shown in FIGS. 9–10. As indicated in blocks 902, 1002 the operations shown in the fifth 900 and sixth 1000 flowcharts commence with the hosting device and the accessory in the UART state which is entered upon executing programs embodying the first flowchart 300 and the second flowchart 400. This is reflected in the first 502 and second 504 lines of the third signal chart. In block 904 the hosting device drives the ID line low, as shown at 1102 in FIG. 11, and in block 906 the hosting device transmits a SET_AUDIO UART command 1104 on the D− line to configure the accessory to receive stereo analog audio signals. Block 1004 is a decision block the outcome of which depends on whether the accessory receives the SET_AUDIO command. When the SET_AUDIO command is received, in block 1006, the accessory sends an acknowledgement 1106 of the SET_AUDIO command in the form of a UART message signal sent back to the hosting device through the D+ line. As indicated in block 908, after having sent the SET_AUDIO UART command, the hosting device waits for acknowledgment. As indicated in block 910, when the acknowledgement is received, the hosting device will drive the D− and D+ lines to a speaker bias voltage as shown at 1108 in FIG. 11. In addition, after the acknowledgement is received, the hosting device releases the ID line in block 912. The hosting device then waits for a predetermined period in block 914 and then commences to output audio on the D+ and D− lines in block 916. After the ID line is released, the voltage level on the ID line will then rise as indicated at 1110. When, in block 1010, the accessory detects that the voltage on the ID line has risen above a predetermined threshold in block 1012 the accessory enables speaker audio. In the case of the accessory 200 shown in FIG. 2 enabling speaker audio includes operating the third MUX/DEMUX 228 to couple the D+ line to the first speaker amplifier 226 and operating the fourth MUX/DEMUX 246 to couple the D− line to the second speaker amplifier 244.

Figure 12:
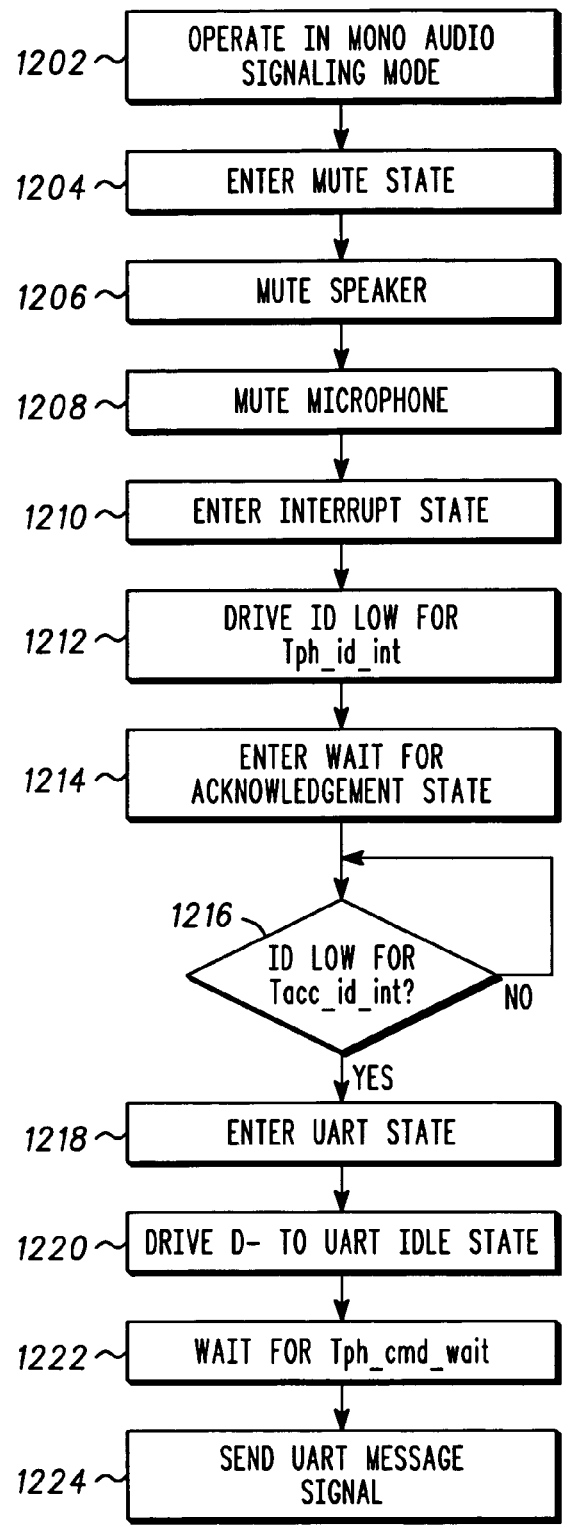
FIG. 12 is a seventh flowchart showing actions performed by a hosting device such as the wireless communication device shown in FIG. 1 in order to transition from analog mono audio signaling mode to UART signaling mode.
Figure 13:
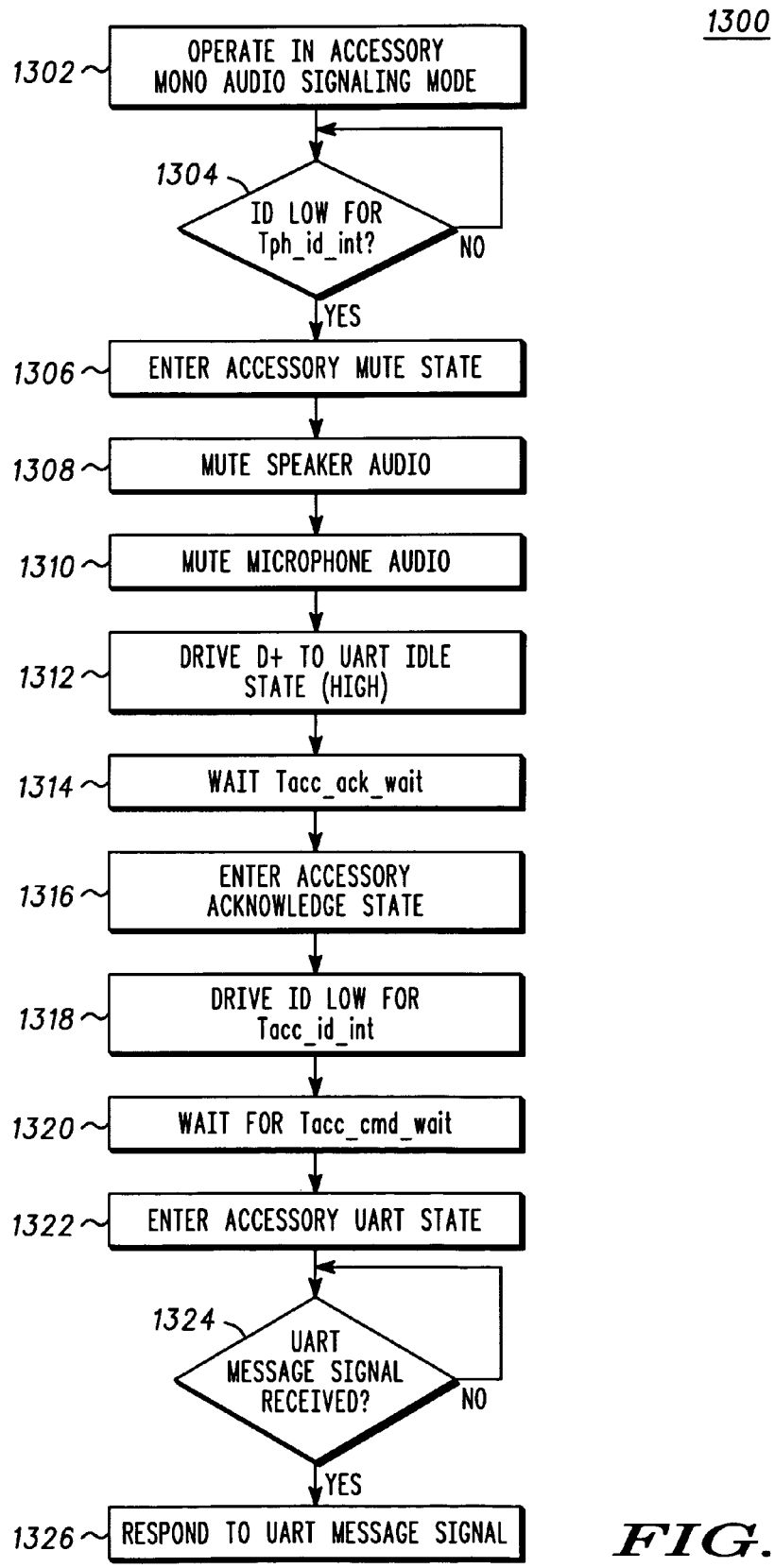
FIG. 13 is a eighth flowchart showing actions performed by an accessory such as the accessory shown in FIG. 2 in response to the actions shown in FIG. 12 which are performed by a hosting device such as the wireless communication device shown in FIG. 1 in order to transition from analog mono audio signaling mode to UART signaling mode.
Figure 14:
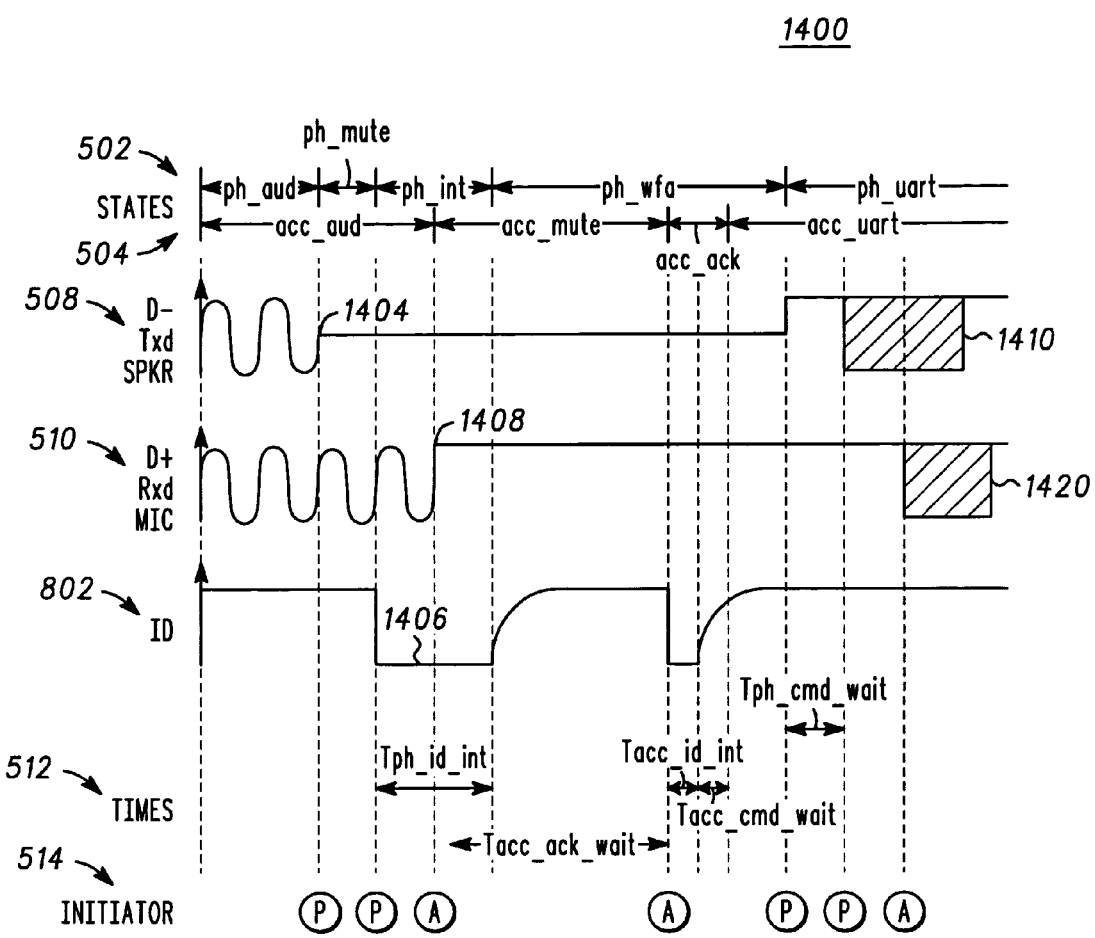
FIG. 14 is a fourth signal chart showing signals exchanged between a hosting device such as the wireless communication device shown in FIG. 1 and an accessory such as the accessory shown in FIG. 2 in the course of performing the actions shown in FIGS. 12–13 in order to transition from analog mono audio signaling mode to UART signaling mode.

FIG. 12 is a seventh flowchart 1200 showing actions performed by a hosting device such as the wireless communication device 100 shown in FIG. 1 in order to transition from analog mono audio signaling mode to UART signaling mode. FIG. 13 is an eighth flowchart 1300 showing actions performed by an accessory such as the accessory 200 shown in FIG. 2 in response to the actions shown in FIG. 12. FIG. 14 is a fourth signal chart 1400 showing signals exchanged in the course of performing the actions shown in FIGS. 12–13 in order to transition from analog mono audio signaling mode to UART signaling mode. As indicated in blocks 1202, 1302 the seventh flowchart 1200 and the eighth flowchart 1300 commence with the hosting device and the accessory in mono audio signaling mode. This also shown in the first 502 and second 504 lines of fourth signal chart 1400. The latter mode is reached upon executing programs embodying the third flowchart 600 and the fourth flowchart 700 shown in FIGS. 6 and 7.

In block 1204 the hosting device enters a mute state labeled ph_mute in FIG. 14. The hosting device enters the mute state in response to a call from higher level software, e.g., application software that is beyond the scope of the present description. In block 1206 the hosting device mutes the audio going out on the D− line to a speaker in the accessory. In the case of the wireless communication device 100, muting the audio going out on the D− line includes ceasing to output audio through the D/A 112, and reconfiguring the second MUX/DEMUX 132 to decouple the D/A 112 from the second signaling line contact (D−) 124. The cessation of audio signaling on the D− line is shown at 1404 in FIG. 14. In block 1208 the hosting device mutes audio on the D+ line that is coming from a microphone (e.g., 225) in the accessory (e.g, 200). In the case of the wireless communication device 100, muting the audio coming in on the D+ line includes operating the first MUX/DEMUX 132 to decouple the first signaling line contact (D+) 122 from the A/D 114. In block 1210 the hosting device enters the interrupt state (labeled ph_int in FIG. 14), and in block 1212 the hosting device drives the ID line low for a time Tph_id_int as indicated at 1406 in FIG. 14. In the case that the hosting device is the wireless communication device 100 shown in FIG. 1, the first ID line driver 134 is used in block 1212 to drive the ID line low. Thereafter, in block 1214 the hosting device goes into a wait for acknowledgement state which is labeled ph_wfa in FIG. 14.

Referring now to FIG. 13, block 1304 is a conditional block the outcome of which depends on the ID line being sensed by the accessory to be low for the period Tph_id_int or fraction thereof. If the ID is sensed to be low for the period Tph_id_int or the fraction thereof, in block 1306 the accessory enters an accessory mute state which is labeled acc_mute in FIG. 14. In the case of the accessory 200 shown in FIG. 2 the second ID level detector 262 is used to sense the signal level of the ID line. In block 1308 the accessory mutes the audio coming in on the D− line and in block 1310 the accessory mutes the audio going out on the D+ line. The latter event is shown at 1408 in FIG. 14. In the case of the accessory 200 shown in FIG. 2 muting the audio coming in on the D− line includes reconfiguring fourth MUX/DEMUX 246 to decouple the fourth signaling line contact (D−) 218 from the second speaker amplifier 244 and muting audio going out on the D+ line includes reconfiguring the third MUX/DEMUX 228 to decouple the third signaling line contact (D+) 216 from the microphone amplifier 224. In block 1312 the accessory drives the D+ line to a UART idle state, and then after waiting for a time Tacc_ack_wait in block 1314, in block 1316 the accessory enters an accessory acknowledge state, which is labeled acc_ack in FIG. 14. In the case of the accessory 200 shown in FIG. 2 the third variable bias network 256 is used to drive the D+ line to the UART idle state. Next, in block 1318 the accessory drives the ID line low for Tacc_id_int, in order to acknowledge the driving of the ID line low by the hosting device in block 1212. In the case of the accessory 200 shown in FIG. 2 the second ID line driver 260 is used to execute block 1318. In block 1320 the accessory waits for acknowledgement state for a time Tacc_cmd_wait, after which in block 1322 the accessory enters a UART state, labeled acc_uart in FIG. 14, to await receipt of a UART message signal in block 1324.

When it is determined by the hosting device in block 1216 that the accessory, in block 1318, has driven the ID line low, in block 1218 the hosting device enters a UART state, labeled ph_uart in FIG. 14, after which in block 1220 the hosting device drives the D− line to the UART idle state (high). The hosting device then waits for a time Tph_cmd_wait in block 1222 and then sends a UART digital message signal 1410 to the accessory on the D− line in block 1224. The UART digital message signal can include queries, commands and/or data. For example, the UART digital message signal can include a command to the accessory to raise or lower audio volume. Such a command could be issued in response to a user input using an optional control button (not shown) of the wireless communication device 100. As another example, the UART digital signal message can include caller ID information which would be displayed on a display (not shown) that is optionally included in the accessory 200.

In the case of the wireless communication device 100 shown in FIG. 1, the first ID level detector 136 is used to detect the ID line being driven low by the accessory, and the first UART module 110 is used to send the UART digital message signal. In carrying out block 1216, the ID level detector 136 compares the voltage on the ID line to an upper bound voltage level.

When in block 1324 it is determined that UART digital message signal has been received, in block 1326 the accessory sends a UART response 1420 to the UART digital message signal 1410. In the case of the accessory 200 shown in FIG. 2 the second UART module 210 is used to send the response to the UART message signal.

Figure 15:
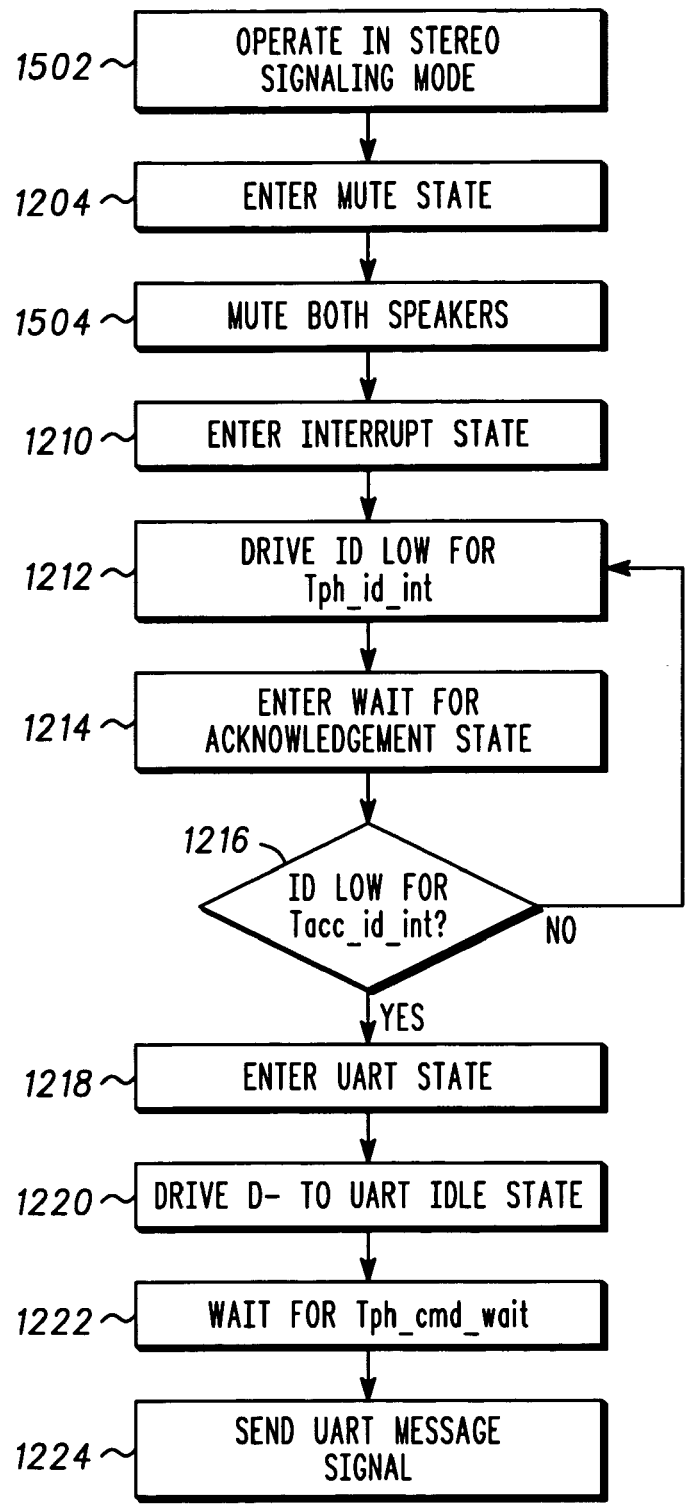
FIG. 15 is a ninth flowchart showing actions performed by a hosting device such as the wireless communication device shown in FIG. 1 in order to transition from analog stereo audio signaling mode to UART signaling mode.
Figure 16:
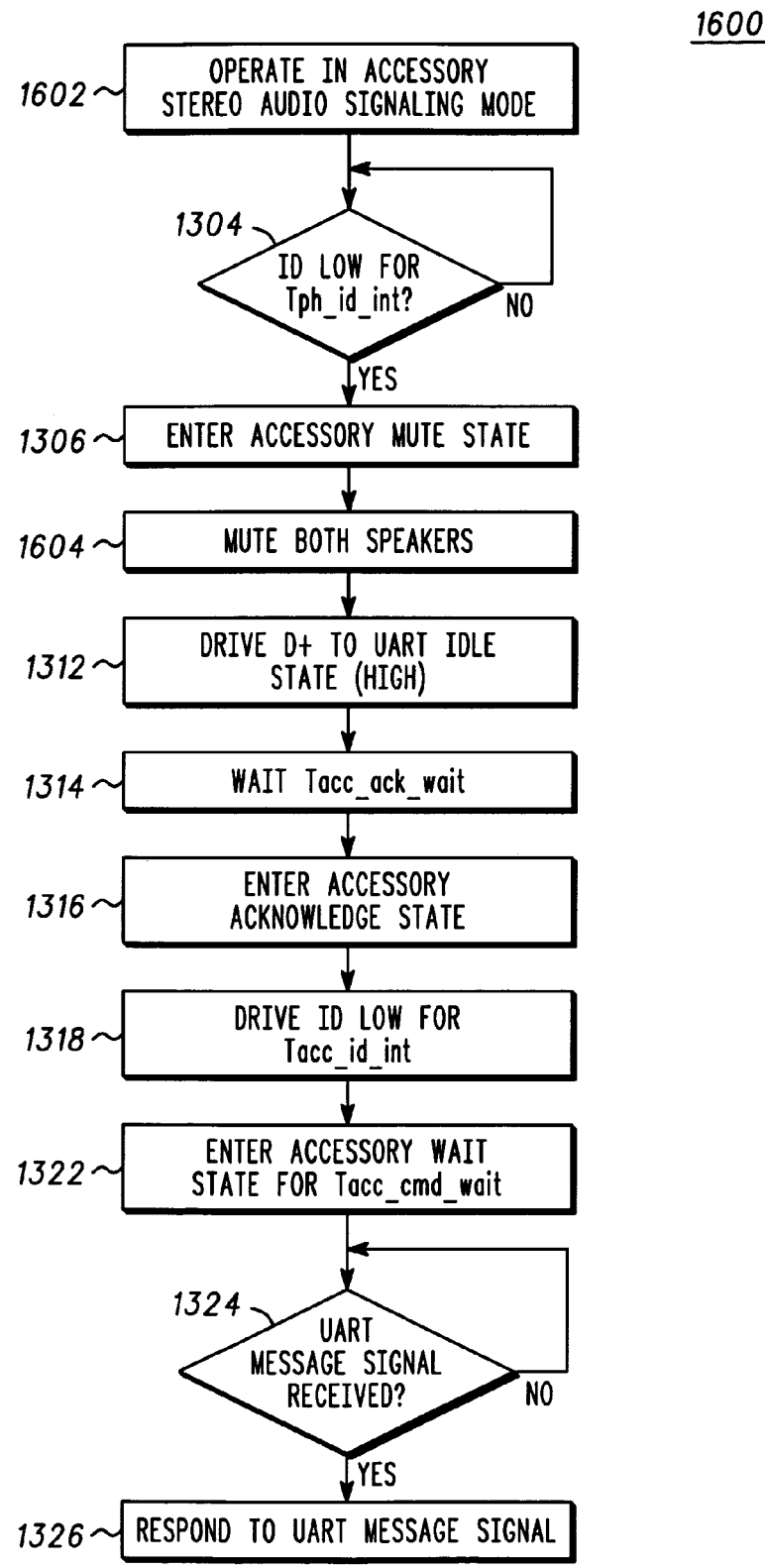
FIG. 16 is a tenth flowchart showing actions performed by an accessory such as the accessory shown in FIG. 2 in response to the actions shown in FIG. 15 which are performed by a hosting device such as the wireless communication device shown in FIG. 1 in order to transition from analog stereo audio signaling mode to UART signaling mode.
Figure 17:
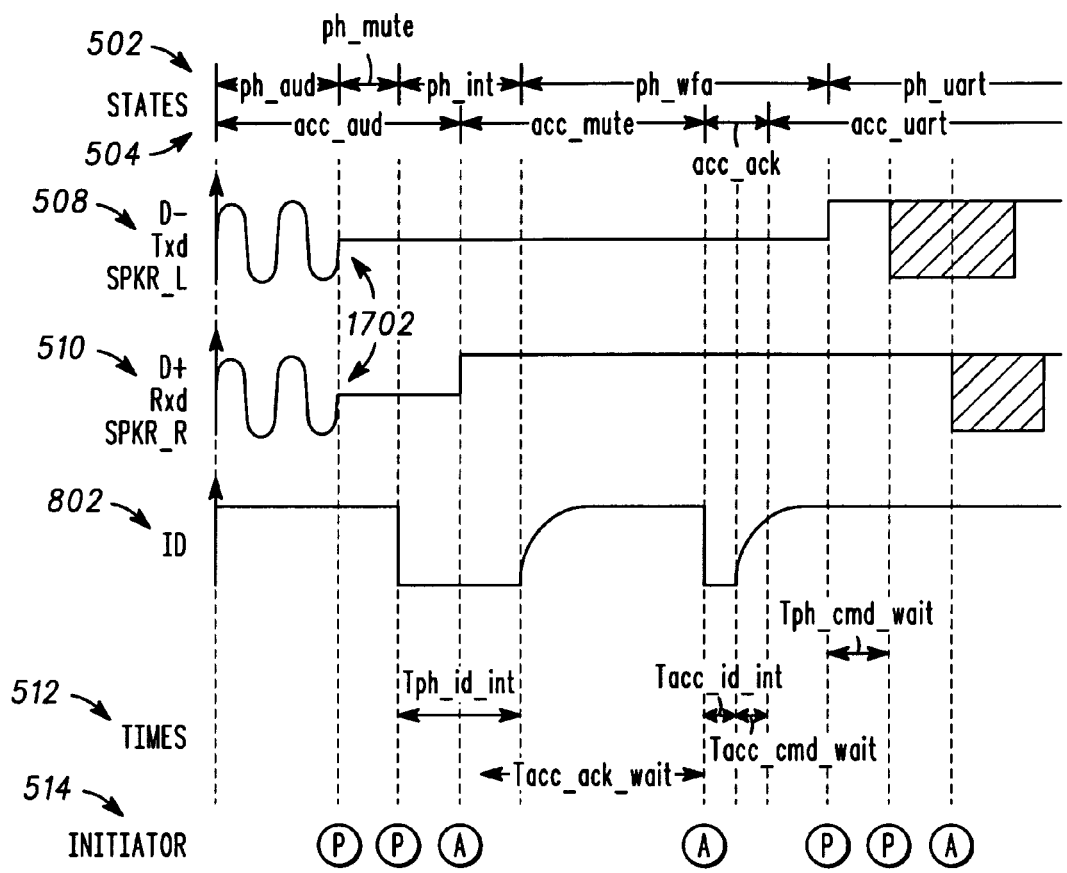
FIG. 17 is a fifth signal chart showing signals exchanged between a hosting device such as the wireless communication device shown in FIG. 1 and an accessory such as the accessory shown in FIG. 2 in the course of performing the actions shown in FIGS. 15–16 in order to transition from analog stereo audio signaling mode to UART signaling mode.

FIG. 15 is a ninth flowchart 1500 showing actions performed by a hosting device such as the wireless communication device 100 shown in FIG. 1 in order to transition from analog stereo audio signaling mode to UART signaling mode. FIG. 16 is a tenth flowchart 1600 showing actions performed by an accessory such the accessory 200 shown in FIG. 2 in response to the actions shown in FIG. 15. FIG. 17 is a fifth signal chart 1700 showing signals exchanged between a hosting device such as the wireless communication device 100 shown in FIG. 1 and an accessory such as the accessory 200 shown in FIG. 2 in the course of performing the actions shown in FIGS. 15–16 in order to transition from analog stereo audio signaling mode to UART signaling mode.

FIGS. 15–17 are analogous to FIGS. 12–14; however FIGS. 15–17 describe a process for transitioning from stereo analog audio signaling mode, as opposed to the process of transitioning from mono audio signaling mode shown in FIGS. 12–14. However, in both instances it is the hosting device that initiates the transitions. The following description addresses the aspects of transitioning from stereo analog signaling mode to UART signaling mode that differ from the process of transitioning from to mono analog signaling which is described above. As indicated in blocks 1502, 1602 the process shown in FIGS. 15–16 commence with the hosting device and the accessory operating in stereo audio signaling mode. Stereo signaling mode is entered by executing the processes described above with reference to the fifth 900 and sixth 1000 flowcharts and the third 1100 signal chart. The principle difference in the actions performed by the hosting device and the accessory is that both the hosting device and the accessory mute both speakers. This is shown in block 1504 in the case of the hosting device, and in block 1604 in the case of the accessory. In the case of the wireless communication device shown in FIG. 1 acting as the hosting device, muting both speakers includes ceasing to operate the D/A 148 to output audio, and reconfiguring the first MUX/DEMUX 132 and the second MUX/DEMUX 133 to decouple the D/A 148 from the first signaling line contact (D+) 122 and the second signaling line contact (D−) 124. In the case of the accessory 200 shown in FIG. 2 muting both speakers includes reconfiguring the third MUX/DEMUX 228 and the fourth MUX/DEMUX 246 to decouple the fourth signaling line contact (D−) 218 from the second speaker amplifier 244 and to decouple the third signaling line contact (D+) 216 from the first speaker amplifier 226. Initial muting of both speakers by the hosting device is indicated by reference numeral 1702 in FIG. 17.

Figure 18:
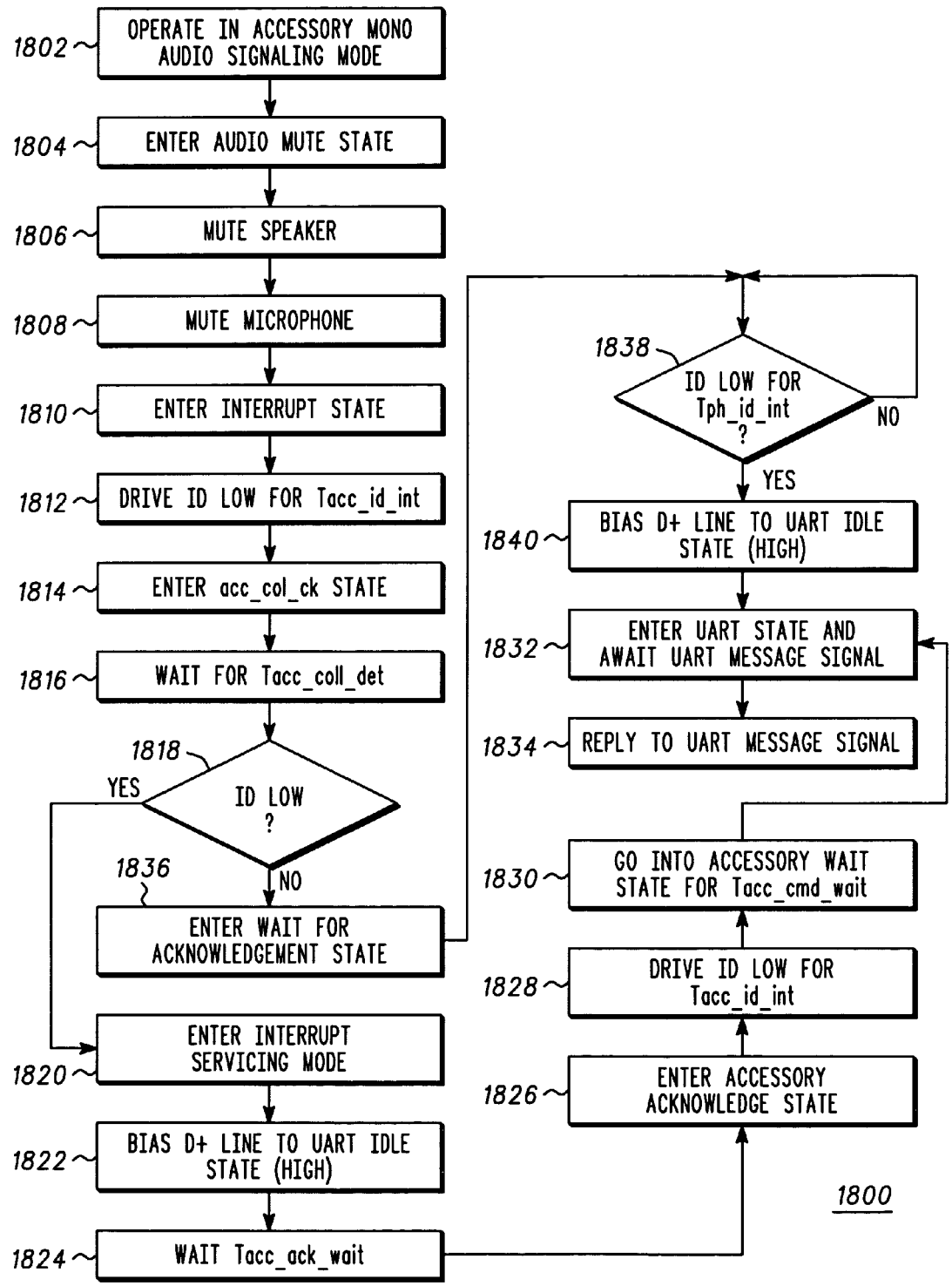
FIG. 18 is a eleventh flowchart showing actions performed by an accessory such as the accessory shown in FIG. 2 in order to transition from analog mono audio signaling mode to UART signaling mode.
Figure 19:
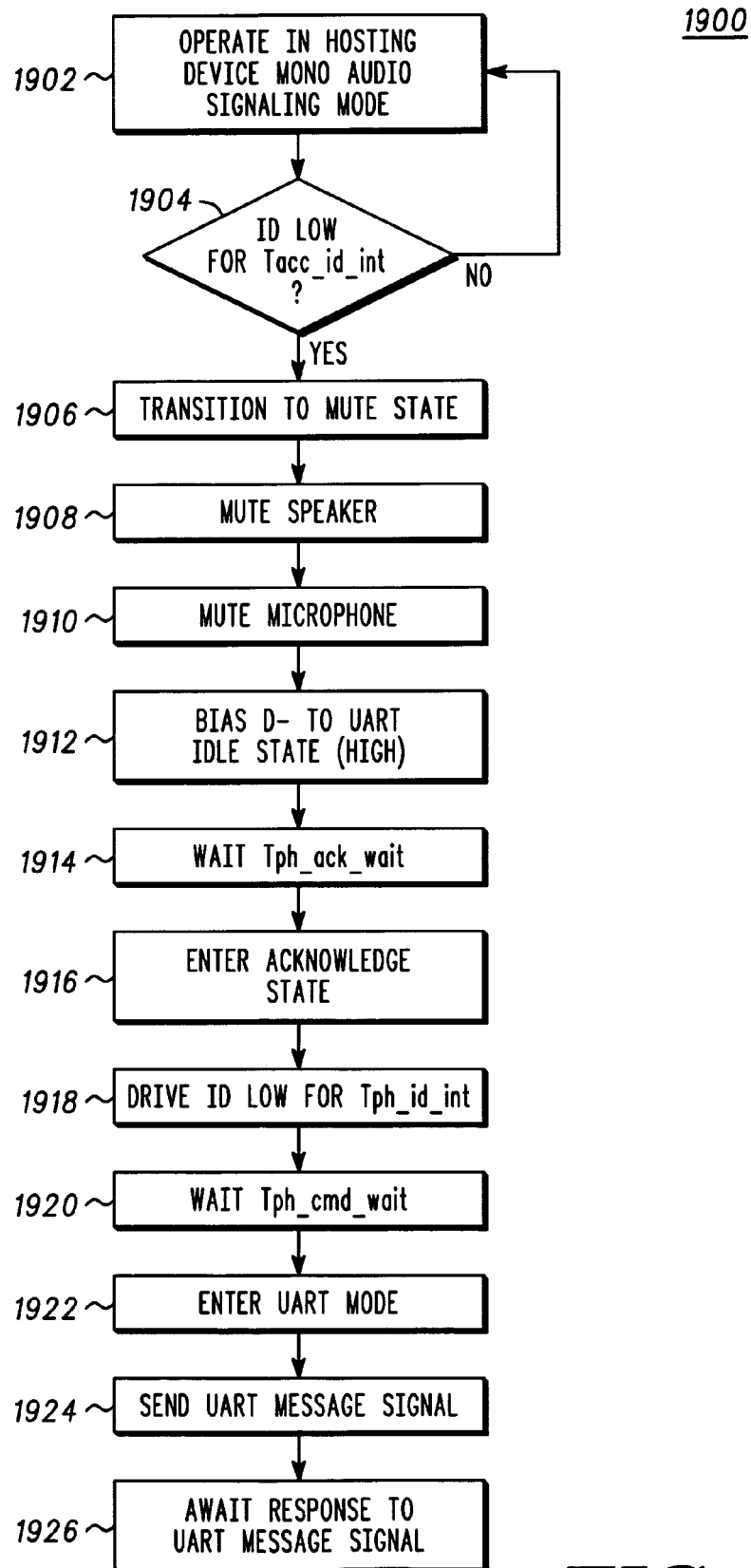
FIG. 19 is a twelfth flowchart showing actions performed by a hosting device such as the wireless communication device shown in FIG. 1 in response to the actions shown in FIG. 18 which are performed by an accessory such as the accessory shown in FIG. 2 in order to transition from analog mono audio signaling mode to UART signaling mode.
Figure 20:
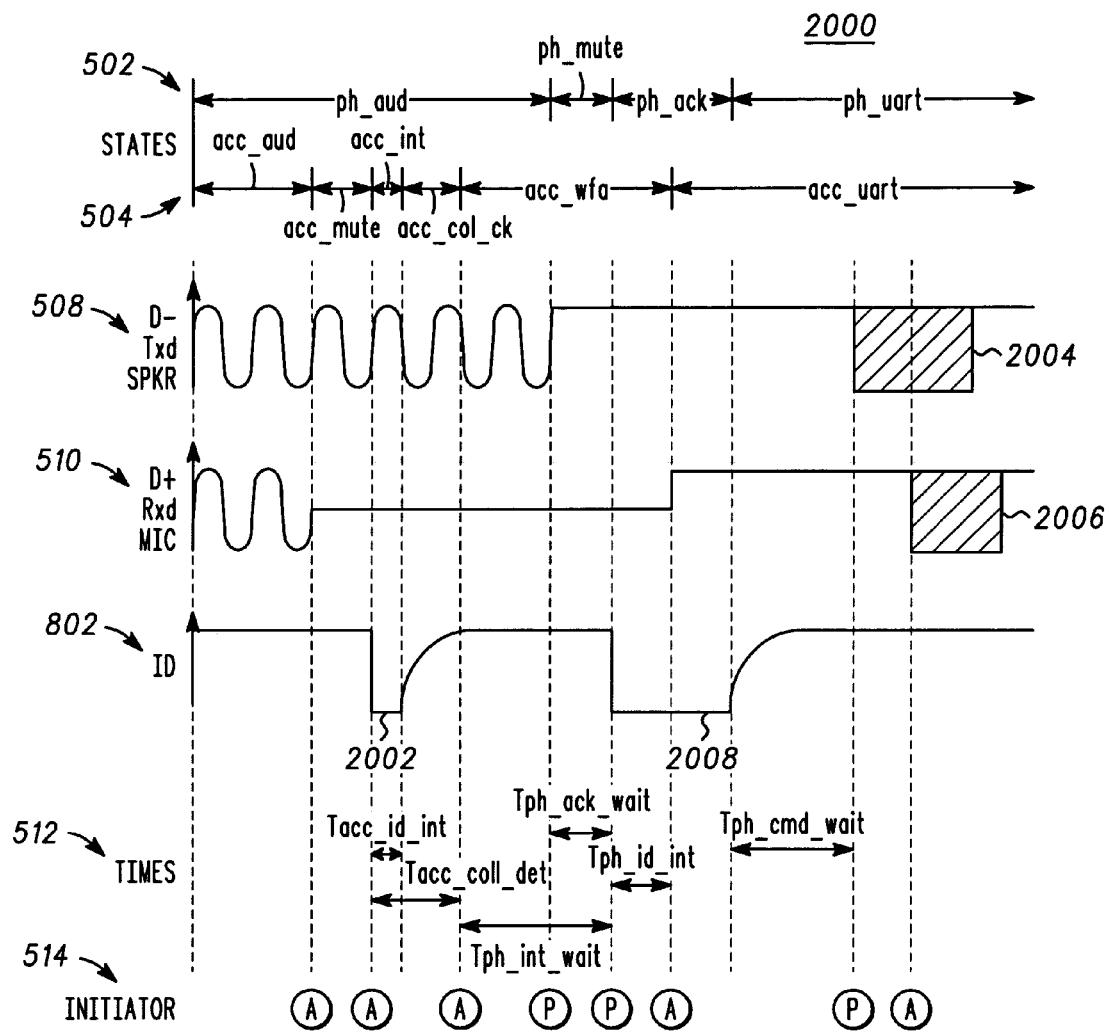
FIG. 20 is a sixth signal chart showing signals exchanged between a hosting device such as the wireless communication device shown in FIG. 1 and an accessory such as the accessory shown in FIG. 2 in the course of performing the actions shown in FIGS. 18–19 in order to transition from analog mono audio signaling mode to UART signaling mode.

FIG. 18 is an eleventh flowchart 1800 showing actions performed by an accessory such as the accessory 200 shown in FIG. 2 in order to transition from analog mono audio signaling mode to UART signaling mode. FIG. 19 is a twelfth flowchart 1900 showing actions performed by a hosting device such as the wireless communication device 100 shown in FIG. 1 in response to the actions shown in FIG. 18. FIG. 20 is a sixth signal chart 2000 showing signals exchanged between the hosting device and the accessory in the course of performing the actions shown in FIGS. 18–19 in a case in which no interrupt collision occurs. In contrast to the process described above with reference to FIGS. 12–14, in the process to be described with reference to FIGS. 18–20 it is the accessory, not the hosting device, that initiates the signaling mode transition.

As indicated in blocks 1802, 1902 the actions shown in the eleventh flowchart 1800 and the twelfth flowchart 1900 commence with accessory and the hosting device operating in mono audio signaling modes labeled ph_aud, acc_aud in FIG. 20. The latter modes are reached upon completion of the processes shown in FIGS. 6–7. In block 1804 the accessory transitions to the audio mute state, labeled acc_mute in FIG. 20. In block 1806, the accessory mutes audio coming in to the accessory's speaker or other device that receives analog audio signals. In block 1808 the accessory mutes audio going out from the accessory's microphone (e.g., 225) or other device that generates analog audio signals. In block 1810 the accessory enters an interrupt state, labeled acc_int in FIG. 20, and in block 1812, as indicated by reference numeral 2002 in FIG. 20, the accessory drives the ID line from high state to low state for a time period Tacc_id_int. The high state is characterized by one voltage level and the low state is characterized by another voltage level. It is noteworthy the time period Tacc_id_int for which the accessory drives the ID line low in order to initially signal the hosting device that a signaling mode transition is to be made is shorter than the time Tph_id_int that was mentioned above, for which the hosting device drives the ID line low in order to initially signal the accessory that a signaling mode transition is to be made. The significance of this difference is discussed further below. In block 1814 the accessory enters an Accessory Collision Check state, labeled acc_col_ck in FIG. 20, and after a time period Tacc_coll_det that is measured from when the ID line was first driven low elapses in block 1816 the accessory proceeds to block 1818. Tacc_coll_det is suitably about equal to the time for which the ID line is driven low Tacc_id_int by the accessory plus a time required for the ID line to charge back up to a high state after being driven low in block 1812. Tacc_coll_det is also less than the time Tph_id_int for which the hosting device drives the ID low in order to initially signal a mode transition.

Block 1818 is a decision block that is used in detecting interrupt collisions. An interrupt collision occurs when both the hosting device and the accessory attempt to interrupt each other at about the same time. Block 1818 tests if after Tacc_coll_det the ID line is still low. If after Tacc_coll_det the ID line is still low, despite the fact that Tacc_coll_det is long enough to allow the ID line to charge back up to the high state after having been pulled low by the accessory in block 1812, it means that another device, i.e. the hosting device, is pulling the ID line to signal an interrupt. Tacc_coll_det is not long enough to miss the ID line having been pulled low for Tph_id_int by the hosting device, if the hosting device pulled the ID line low starting at about the same time as the accessory in order to initiate a mode transition. Note that Tacc_coll_det is shorter than the interval between when the ID is driven low to initiate a mode transition and a time at which the ID line is driven low to acknowledge the initiation of the mode transition. Consequently, if the ID line is found to be low in block 1818 its state is not attributed to the ID being set low in acknowledgement of the ID line having been set low in block 1812. In block 1818 the accessory determines if the voltage on the ID line is below a predetermined voltage level.

If the accessory detects an interrupt collision, i.e. if it is determined in block 1818 that the ID line is low, then the accessory proceeds to block 1820 and enters an interrupt servicing mode. In the interrupt service mode, the accessory function in the manner such as described above in reference to FIG. 13. In particular, as shown in FIG. 18, in block 1822 the accessory biases the D+ line to the UART idle state (i.e. high state), in block 1824 the accessory waits for a time period Tacc_ack_wait, in block 1826 the accessory enters an acknowledge state, in block 1828 the accessory drives the ID line low (a predetermined voltage level) for Tacc_id_int to communicate an acknowledgement of the hosting device's initiation a signaling mode transition, in block 1830 the accessory goes into a wait state for a period Tacc_cmd_wait, in block 1832 the accessory enters a UART state and awaits the UART digital message signal, and in block 1834 the accessory replies to the UART digital message signal. The UART digital message signal 2004 and the response 2006 thereto are shown in FIG. 20.

If on the other hand, it is determined in block 1818 that the ID line is not low, i.e. if an interrupt collision is not detected, then in block 1836 the accessory enters a wait for acknowledgment state, waits for a predetermined period of time Tph_int_wait, and then proceeds to block 1838. Proceeding from block 1838 is conditioned on receipt of an acknowledgment from the hosting device in the form of the ID line being set low for the period Tph_id_int. In block 1838 the voltage on the ID line is compared to a predetermined voltage level, suitably the same predetermined voltage level used in block 1818. When the acknowledgement is detected the accessory proceeds to block 1840 in which the D+ line is biased to the UART idle state, and thereafter the accessory proceeds to block 1832 and 1834 previously described. Note that the signal on the ID line shown in the eighth line 802 in FIG. 20 is for the case that there is no interrupt collision.

According to the eleventh flowchart 1800 the accessory will defer to the hosting device in the case that both devices attempt to interrupt each other at about the same time. Alternatively, the hosting device defers to the accessory. FIG. 19 shows the responses of the hosting device to the operation of the accessory depicted in FIG. 18 in the case that the hosting device is not trying to interrupt the accessory at the same time that the accessory is trying to interrupt the hosting device. Referring to FIG. 19, when the hosting device detects, in block 1904 that the accessory (in block 1812) has set the ID line low for Tacc_id_int, the hosting device transitions to a mute state (labeled ph_mute in FIG. 20) in block 1906, mutes audio going out on the D− line to a loudspeaker (e.g., 229) or other device in the accessory in block 1908, mutes audio coming in from a microphone (e.g., 225) or other device in the accessory in block 1910, biases the D− line to the UART idle state in block 1912, waits a period Tph_ack_wait in block 1914, transitions to an acknowledge state (labeled ph_ack in FIG. 20) in block 1916, drives the ID low for a time Tph_id_int to acknowledge the accessory, as shown at 2008 in FIG. 20, in block 1918, waits a period Tph_cmd_wait in block 1920, enters a UART signaling mode (labeled ph_uart in FIG. 20) in block 1922 and sends the UART digital message signal 2004 in block 1924, and awaits receipt of the response 2006 thereto in block 1926. Further processing of the response to the contents of the UART digital message signal is handled by higher layer software and is beyond the focus of this description.

Figure 21:
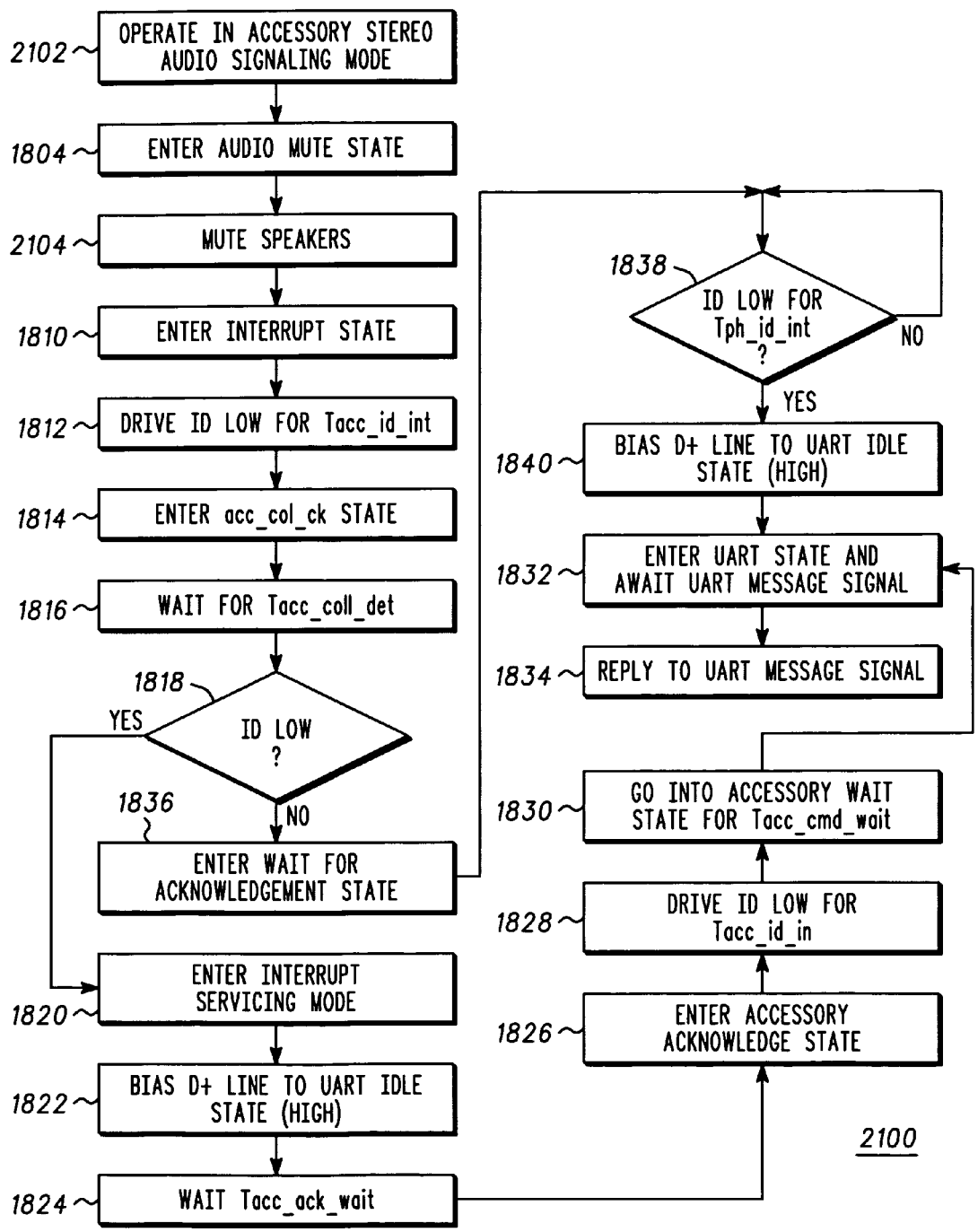
FIG. 21 is a thirteenth flowchart showing actions performed by an accessory such as the accessory shown in FIG. 2 to transition from analog stereo audio signaling mode to UART signaling mode.
Figure 22:
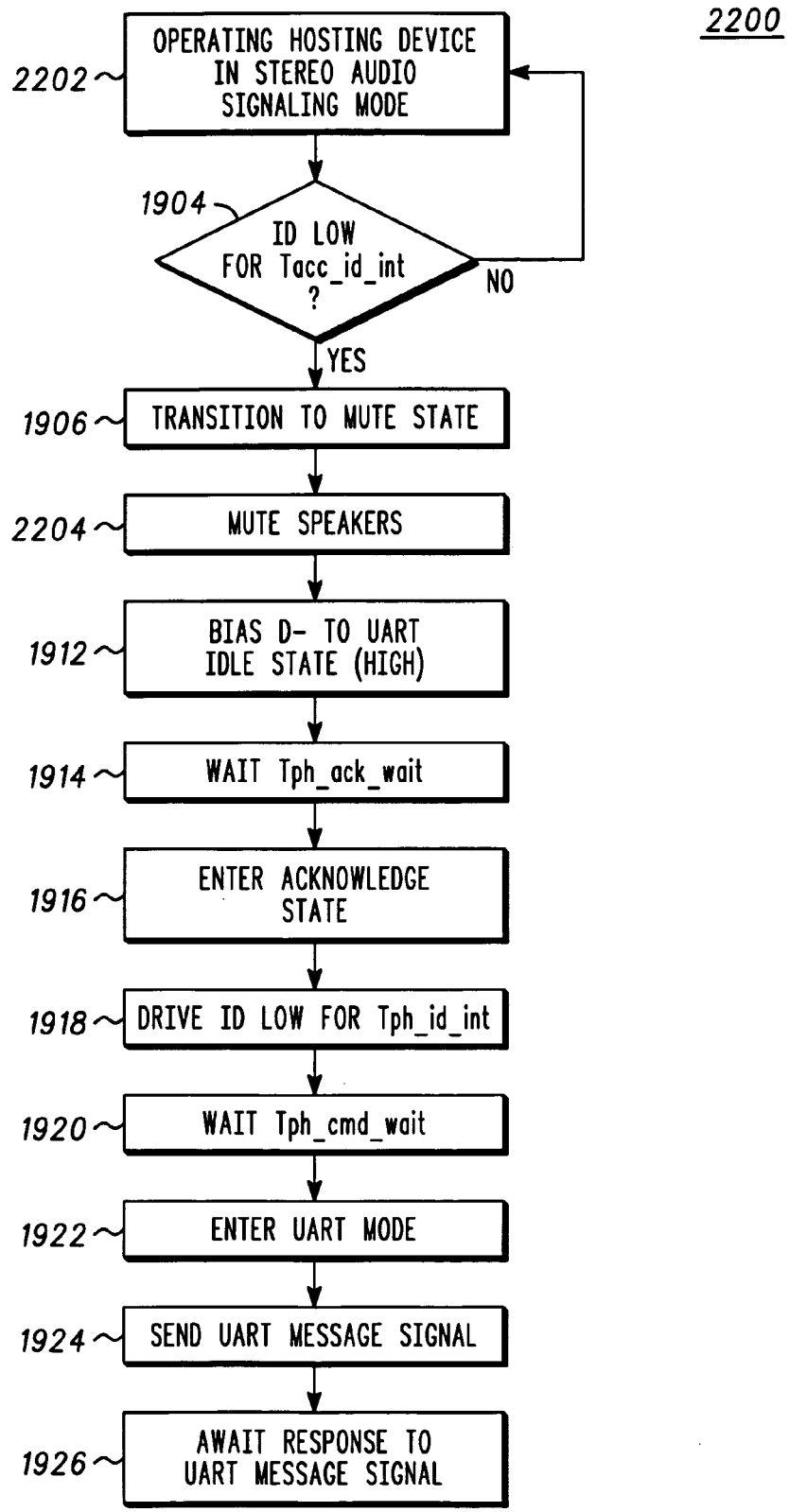
FIG. 22 is a fourteenth flowchart showing actions performed by a hosting device such as the wireless communication device shown in FIG. 1 in response to the actions shown in FIG. 21 which are performed by an accessory such as the accessory shown in FIG. 2 in order to transition from analog stereo mode signaling to UART signaling.
Figure 23:
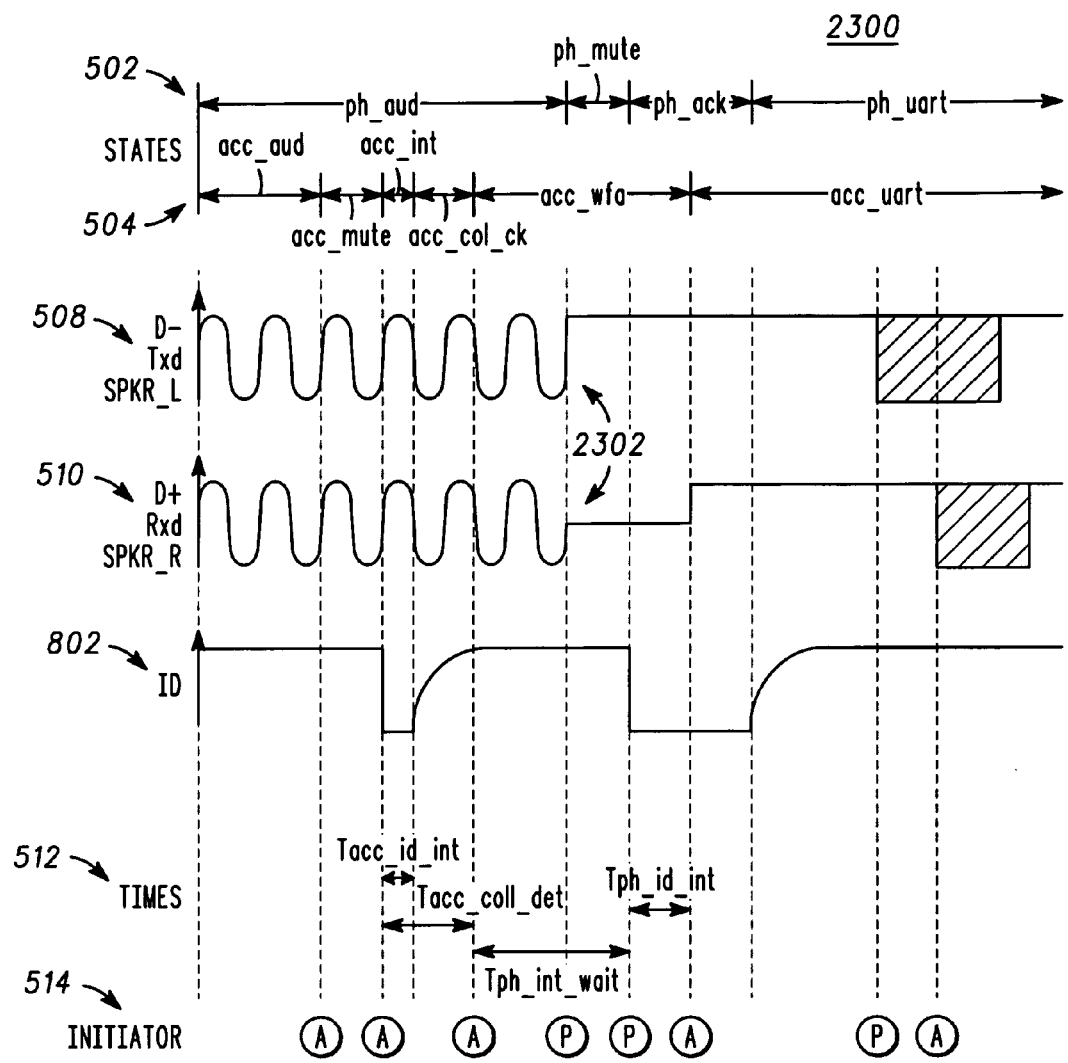
FIG. 23 is a seventh signal chart showing signals exchanged between a hosting device such as the wireless communication device shown in FIG. 1 and an accessory such as the accessory shown in FIG. 2 in the course of performing the actions shown in FIGS. 21–22 in a case in which there is no interrupt collision.

FIG. 21 is a thirteenth flowchart 2100 showing actions performed by an accessory such as the accessory 200 shown in FIG. 2 to transition from analog stereo audio signaling mode to UART signaling mode. FIG. 22 is a fourteenth flowchart 2200 showing actions performed by a hosting device such as the wireless communication device 100 shown in FIG. 1 in response to the actions shown in FIG. 21. FIG. 23 is a seventh signal chart 2300 showing signals exchanged between the hosting device and the accessory in the course of performing the actions shown in FIGS. 21, 22 in a case in which there is no interrupt collision. As indicated in blocks 2102, 2202, in contrast to the processes depicted in FIGS. 18, 19 which start with the hosting device and the accessory operating in mono audio signaling mode, the processes depicted in FIGS. 21, 22 commence with the hosting device and the accessory operating in stereo audio signaling mode. However, in as much as the processes are quite similar, only certain minor difference are described below. In particular, in block 2104 the hosting device mutes stereo audio going out on the D− and D+ lines to speakers or other stereo audio receiving devices in the accessory. Similarly, in block 2204 the accessory mutes audio coming in on the D− and D+ lines. A point at which audio going out on the D− and D+ lines is muted by the hosting device is shown at 2302 in FIG. 23. Note that FIG. 23 depicts signals in the case that no interrupt collision is detected in block 1818.

Figure 24:
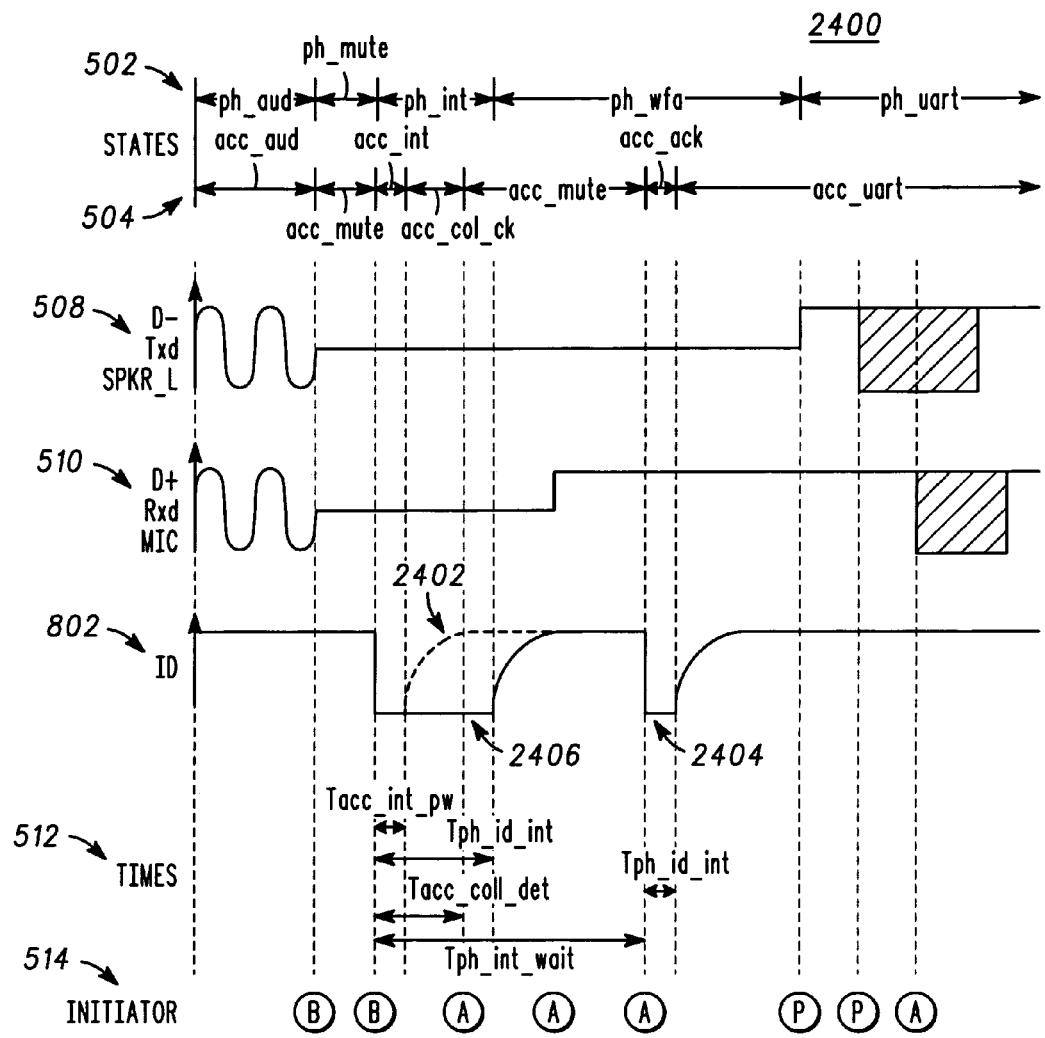
FIG. 24 is a eighth signal chart showing signals exchanged between a hosting device such as the wireless communication device shown in FIG. 1 and an accessory such as the accessory shown in FIG. 2 in the course of performing the actions shown in FIGS. 21–22 in a case in which there is an interrupt collision.

FIG. 24 is an eighth signal chart 2400 showing signals exchanged between a hosting device such as the wireless communication device 100 shown in FIG. 1 and an accessory such as the accessory shown in FIG. 2 in the course of performing the actions shown in FIGS. 18, 19, 21, 22 in a case in which an interrupt collision occurs. The interrupt collision occurs when both the hosting device and the accessory attempt to pull the ID line low to initiate a signaling mode transition at the same time. In the eighth line 802 of FIG. 24 a portion of graph 2402 depicting what the ID line signal would be if only the accessory had initiated the interrupt is shown with a dashed line. The true signal due to the hosting device also initiating a mode transition by pulling the ID line low is shown with a solid line. As discussed above when the accessory detects that the hosting device is also trying to initiate a signaling mode transition, the accessory will defer to the hosting device, and service the interrupt of the hosting device. In doing so, the accessory will pull the ID line low as indicated at 2404 to acknowledge the ID line having been pulled low by the hosting device at 2406. Other aspects of the operation of the accessory in case an interrupt collision occurs are discussed above with reference to FIGS. 18 and 21. When a collision occurs, the hosting device need not alter its operation, because the accessory defers to the hosting device. The processes by which the hosting device transitions from audio signaling mode to UART signaling mode that are initiated by the hosting device are described above with reference to FIGS. 12–17.

By using the ID line as described above to initiate and negotiate transitions from audio signaling mode to digital signaling mode, generation of signal components on the D− and D+ lines that would be amplified and heard as audible noise or pops is avoided.

While the preferred and other embodiments of the invention have been illustrated and described, it will be clear that the invention is not so limited. Numerous modifications, changes, variations, substitutions, and equivalents will occur to those of ordinary skill in the art without departing from the spirit and scope of the present invention as defined by the following claims.

What is claimed is:

1. An electronic apparatus comprising:
   one or more electrical circuits adapted to selectively generate a first digital message signal and a first analog audio signal;
   a connector for coupling said first digital message signal and said first analog audio signal to an external device, said connector comprises a first contact and a second contact, wherein said first contact is coupled to said one or more electrical circuits and is adapted to carry said first digital message signal and said first analog audio signal; and
   a driver coupled to said second contact, wherein said driver is adapted to change a signal level on said second contact in order to signal a first transition between a first mode in which said first digital message signal is generated and coupled through said connector to said external device, and a second mode in which said first analog audio signal is generated and coupled through said connector to said external device.

2. The electronic apparatus according to claim 1 wherein said one or more electrical circuits comprise:
   a UART module for generating said first digital message signal;
   a digital-to-analog converter for generating said first analog audio signal; and
   a switch network comprising a first input coupled to said UART module, a second input coupled to said digital-to-analog converter and an output coupled to said first contact.

3. The electronic apparatus according to claim 1 further comprising:
   a microphone; and
   wherein said one or more electrical circuits comprise:
      a UART module for generating said first digital message signal;
      an amplifier for amplifying said first analog audio signal, said amplifier having an amplifier input coupled to said microphone and an amplifier output; and
      a switch network comprising a first input coupled to said UART module, a second input coupled to said amplifier output and an output coupled to said first contact.

4. The electronic apparatus according to claim 1 further comprising:
   a variable bias network coupled to said first contact wherein said variable bias network is capable of selectively setting a bias on said first contact to a first level for said first digital message signal and a second level for said first analog audio signal.

5. The electronic apparatus according to claim 1 wherein:
   said connector further comprises a third contact for coupling a second digital message signal from said external device to said electronic apparatus; and
   said electronic apparatus further comprises a signal level detector coupled to said second contact, said signal level detector serving to detect a change in said signal level on said second contact that is induced by said external device in order to signal a second transition between said first mode and said second mode.

6. The electronic apparatus according to claim 5 wherein said third contact is adapted to couple a second analog audio signal.

7. The electronic apparatus according to claim 6 wherein said third contact is adapted to couple said second analog audio signal from said external device to said electronic apparatus.

8. The electronic apparatus according to claim 7 further comprising:
   a loudspeaker; and
   wherein said one or more electrical circuits comprise:
      a UART module for processing said second digital message signal;
      an amplifier having an amplifier input wherein said amplifier is coupled to said loudspeaker; and
      a switch network comprising an input coupled to said third contact, a first output coupled to said UART module, and a second output coupled to said amplifier input.

9. The electronic apparatus according to claim 5 wherein said connector further comprises:
   a fourth contact for coupling a bus voltage between said electronic apparatus and said external device; and
   a fifth contact for coupling ground references of said electronic apparatus and said external device.

10. An electronic apparatus comprising:
    one or more electrical circuits adapted to receive a digital message signal and an analog audio signal;
    a connector for coupling said digital message signal and said analog audio signal from an external device, said connector comprising a first contact and a second contact, wherein said first contact is coupled to said one or more electrical circuits and is adapted to carry said digital message signal and said analog audio signal; and
    a signal level detector coupled to said second contact, said signal level detector serving to detect a change in a signal level on said second contact that is induced by said external device in order to signal a transition between a first mode in which said digital message signal is received through said first contact, and a second mode in which said analog audio signal is received through said first contact.

11. The electronic apparatus according to claim 10 wherein said one or more electrical circuits comprise:
    a UART module for processing said digital message signal;
    an amplifier for amplifying said analog audio signal; and
    a demultiplexer comprising a first input coupled to said first contact, a first output coupled to said UART module, and a second output coupled to said amplifier.

12. The electronic apparatus according to claim 10 further comprising:
    a variable bias network coupled to said first contact wherein said variable bias network is capable of selectively setting a bias on said first contact to a first level for said digital message signal and a second level for said analog audio signal.

13. The electronic apparatus according to claim 10 further comprising:
a loudspeaker coupled to said one or more electrical circuits.

14. An electronic system comprising:
a first electronic apparatus comprising:
one or more first electrical circuits adapted to selectively generate a first digital message signal and a first analog audio signal;
a first connector for coupling said first digital message signal and said first analog audio signal, said first connector comprising a first contact and a second contact, wherein said first contact is coupled to said one or more first electrical circuits and is adapted to carry said first digital message signal and said first analog audio signal;
a first driver coupled to said second contact, wherein said first driver is adapted to change a signal level on said second contact in order to signal a first transition between a first mode in which said first digital message signal is generated and coupled through said first contact, and a second mode in which said first analog audio signal is generated and coupled through said first contact; and
a second electronic apparatus comprising:
one or more second electrical circuits adapted to receive said first digital message signal and said first analog audio signal;
a second connector adapted to mate with said first connector for coupling said first digital message signal and said first analog audio signal from said first electronic apparatus, said second connector comprising a third contact for coupling to said first contact, and a fourth contact for coupling to said second contact; and
a first signal level detector coupled to said fourth contact, said first signal level detector serving to detect a change in said signal level on said second contact through said fourth contact.

15. The electronic system according to claim 14 wherein:
said one or more first electrical circuits comprise:
a first UART module for generating said first digital message signal;
a digital-to-analog converter for generating said first analog audio signal; and
a switch network having a first input coupled to said first UART module, a second input coupled to said digital-to-analog converter and an output coupled to said first contact; and
said one or more second electrical circuits comprise:
a second UART module for processing said first digital message signal;
an amplifier for amplifying said first analog audio signal; and
a demultiplexer having an input coupled said third contact, a first output coupled to said second UART module, and a second output coupled to said amplifier.

16. The electronic system according to claim 15 wherein said second electronic apparatus further comprises a loudspeaker having an input coupled to said amplifier.

17. The electronic system according to claim 14 wherein:
said first connector comprises a fifth contact coupled to said one or more first electrical circuits of said first electronic apparatus and said second connector comprises a sixth contact coupled to said one or more second electrical circuits of said second electronic apparatus wherein said sixth contact is coupled to said fifth contact, and said fifth contact and said sixth contact serve to couple a second analog audio signal and a second digital message signal from said one or more second electrical circuits to said one or more first electrical circuits;
said second electronic apparatus further comprises a second driver coupled to said fourth contact, wherein said second driver is adapted to change a signal level on said fourth contact in order to signal a second transition between said first mode in which said second digital message signal is generated and coupled through said second connector and said first connector, and said second mode in which said second analog audio signal is generated and coupled through said second connector and said first connector; and
said first electronic apparatus further comprises a second signal level detector coupled to said second contact, said second signal level detector serving to detect, via said second contact, a change in said signal level on said fourth contact that is induced by said second driver.

18. The electronic system according to claim 17 wherein:
said one or more first electrical circuits comprise:
a first UART module comprising a first UART output for outputting said first digital message signal, and a first UART input for receiving said second digital message signal;
a digital-to-analog converter for generating said first analog audio signal;
an analog-to-digital converter for processing said second analog audio signal;
a first multiplexer/demultiplexer having a first terminal coupled to said first UART input, a second terminal coupled to said analog-to-digital converter, and a third terminal coupled to said fifth contact, wherein said first multiplexer/demultiplexer is adapted to selectively couple said first UART input and said analog-to-digital converter to said fifth contact; and
a second multiplexer/demultiplexer having a fourth terminal coupled to said first UART output, a fifth terminal coupled to said digital-to-analog converter, and a sixth terminal coupled to said first contact, wherein said second multiplexer/demultiplexer is adapted to selectively couple said first UART output and said digital-to-analog converter to said first contact; and said one or more second electrical circuits comprise:
a second UART module comprising a second UART output for outputting said second digital message signal, and a second UART input for receiving said first digital message signal;
a first amplifier for amplifying said first analog audio signal;
a second amplifier for amplifying said second analog audio signal;
a third multiplexer/demultiplexer comprising a seventh terminal coupled to said second UART input, an eighth terminal coupled to said first amplifier, and a ninth terminal coupled to said third contact, wherein said third multiplexer/demultiplexer is adapted to selectively couple said third contact to said second UART input and said first amplifier; and
a fourth multiplexer/demultiplexer comprising a tenth terminal coupled to said second amplifier, an eleventh terminal coupled to said second UART output, and a twelfth terminal coupled to said sixth contact, wherein said fourth multiplexer/demultiplexer is adapted to selectively couple said second UART output and said second amplifier to said sixth contact.

19. The electronic system according to claim 18 further wherein said second electronic apparatus further comprises a loudspeaker having an input coupled to said first amplifier, and a microphone having an output coupled to said second amplifier.

20. In a system comprising a first electronic apparatus coupled to a second electronic apparatus through a connector that includes a first contact that is used carry both analog audio signals and digital message signals, a method of transitioning the system between a first mode in which analog audio signals are carried on the first contact and a second mode in which digital message signals are carried on the first contact, the method comprising:
from the first electronic apparatus, driving a voltage on a second contact of said connector from a first voltage level to a second voltage level for a first time period to signal, to the second electronic apparatus, a change from the first mode to the second mode.

21. The method according to claim 20 further comprising:
subsequently testing if the voltage on said second contact is in a first range bounded by a third voltage level; and
if the voltage on said second contact is in said first range, proceeding to transition between the first mode and the second mode.

22. The method according to claim 21 wherein said first voltage level is above said second voltage level, and said third voltage level is between said first voltage level and said second voltage level.

23. The method according to claim 22 wherein said third voltage level is a lower bound of said first range.

24. The method according to claim 22 wherein said third voltage level is an upper bound of said first range.

25. The method according to claim 24 further wherein:
if when subsequently tested the voltage on the second contact is below the third voltage level, waiting a second time period and then, from the first electronic apparatus, driving the voltage on the second contact to a fourth voltage level for a third time period to an acknowledge a mode interrupt initiated by the second electronic apparatus; and
if, when subsequently tested, the voltage on the second contact exceeds the third voltage level, waiting for a fourth time period and testing if the voltage on the second contact is in a range bounded by a fifth voltage level to check for acknowledgment by the second electronic apparatus.

26. The method according to claim 25 wherein:
the second voltage level is substantially equal to the fourth voltage level; and
the third voltage level is substantially equal to the fifth voltage level.

27. In a system comprising a first electronic apparatus coupled to a second electronic apparatus through a connector that includes a first contact that is used carry both analog audio signals and digital message signals, a method of transitioning the system between a first mode in which digital message signals are coupled through the first contact and a second mode in which analog audio signals are coupled through the first contact, the method comprising:
in said first electronic apparatus, driving a voltage on a second contact of said connector to a first state;
from said second electronic apparatus, driving said voltage on said second contact of said connector to said first state;
configuring said first electronic apparatus to output audio;
after configuring said first electronic apparatus to output audio, in said first electronic apparatus, ceasing to drive said voltage on said second contact;
configuring said second electronic apparatus to receive audio;
after configuring said second electronic apparatus to receive audio, ceasing to drive said voltage on said second contact from said second electronic apparatus;
in said first electronic apparatus, after ceasing to drive said voltage on said second contact, comparing said voltage on said second contact to a first voltage level, and when said voltage on said second contact passes said first voltage level, starting to output audio on said first contact; and
in said second electronic apparatus, after ceasing to drive said voltage on said second contact, comparing said voltage on said second contact to a second voltage level, and when said voltage on said second contact passes said second voltage level, coupling said first contact to an audio device.

28. The method according to claim 27 wherein said first voltage level equals said second voltage level.

* * * * *